United States Patent [19]

Cheng

[11] Patent Number: 5,526,653
[45] Date of Patent: Jun. 18, 1996

[54] IMMEDIATE HEAT UPGRADING AIR CONDITIONING SYSTEM AND ASSOCIATED COOL THERMAL STORAGE

[76] Inventor: Chen-Yen Cheng, c/o Dr. Wu-Cheng Cheng, 10308 Paddington Ct., Ellicott City, Md. 21042

[21] Appl. No.: 295,771

[22] PCT Filed: Mar. 1, 1993

[86] PCT No.: PCT/US93/02214

§ 371 Date: Aug. 29, 1994

§ 102(e) Date: Aug. 29, 1994

[87] PCT Pub. No.: WO93/18359

PCT Pub. Date: Sep. 16, 1993

[51] Int. Cl.[6] ............................................. B01D 9/04
[52] U.S. Cl. ................................... 62/532; 62/123
[58] Field of Search ........................... 62/10, 532, 123

[56] References Cited

U.S. PATENT DOCUMENTS

| | | | |
|---|---|---|---|
| 4,236,382 | 12/1980 | Cheng et al. | 62/10 |
| 4,505,728 | 3/1985 | Cheng et al. | 62/10 |
| 4,578,093 | 3/1985 | Cheng et al. | 62/10 |
| 4,650,507 | 3/1987 | Cheng et al. | 62/10 |
| 4,654,064 | 3/1987 | Cheng et al. | 62/10 |
| 4,810,274 | 3/1989 | Cheng et al. | 62/10 |

*Primary Examiner*—Ronald C. Capossela

[57] ABSTRACT

A general system for heat upgrading by absorption and a system for conducting multiple pressure zone evaporation-absorption operations are introduced. The system comprises an enclosure, two sets of vertical heat conductive walls, designated as A-walls and B-walls, each wall having a first surface and a second surface that are respectively designated as A-1 and A-2 surfaces and B-1 and B-2 surfaces, and four processing zones, respectively designated as A-1, A-2, A-3 and A-4 zones. Zone A-1 and Zone A-2 are inside of the enclosure and are respectively in contact with A-1 and B-1 surfaces; Zone A-3 and Zone A-4 are outside of the enclosure and are respectively in contact with A-2 and B-2 surfaces. In operation, heat is taken from a first mass of fluid in Zone A-3 to vaporize water from a falling water film in Zone A-1 to form a first water vapor. The first vapor is absorbed into a falling film of an absorbing solution in Zone A-2 and releases heat of absorption to a second mass of fluid in Zone A-4. A multiple pressure zone (MPZ) system and operation are also introduced. An MPZ operation has important advantages over a single pressure zone operation.

29 Claims, 16 Drawing Sheets

IMMEDIATE HEAT UPGRADING AIR CONDITIONING SYSTEM AND ASSOCIATED COOL THERMAL STORAGE

1. Field of the Invention (Technical Field)

The processes and apparatus of the present invention are related to (a) air conditioning with heat upgrading by an absorption operation and (b) cool thermal storage that can be charged during off peak hours of power consumption and be discharged to provide air conditioning during peak hours of power consumption.

2. Background Art

Since Immediate Heat Upgrading Absorption Air Conditioning System [IHUA Systems] of the present invention can provide air conditioning by absorption for big areas and small areas and can also provide cool thermal storages by storing water and concentrated absorbing solutions, prior art on (a) absorption air conditioning, and (b) cool thermal storage are reviewed in the following:

2A. Absorption Air Conditioning

A large-scale absorption air conditioning process comprises (a) a step of producing a stream of chilled liquid such as water or an aqueous solution of ethylene glycol at around 7.2° C. (45° F.), in an absorption liquid chiller and (b) a step of circulating a stream of the chilled liquid through air handlers to remove heat from indoor air and thereby return the liquid at around 15.5° C. (16° F.). Manufacturers of absorption chillers are Trane Corp. in Wisconsin and Carrier Corp. in New York State. There are several manufacturers in Japan includint Mitsubishi and Yasaki. A commercial absorption liquid chiller has a large vacuum enclosure enclosing (a) an evaporation zone, (b) an absorption zone, (c) a regeneration zone and (d) a condensation zone. The processing steps are as follows:

(a) As water enters the evaporation zone, flash vaporization causes formation of a first vapor and mass of internal chilled water at around 4.4° C. (40° F.). An external chill water at a first temperature around 15.5° C. (60° F.) then exchange heat with the internal chill water thereby cooled to a second temperature at around 7.2° C. (45° F.). The chilled external chill water is then circulated to air handlers and heated to the first temperature and returned to he liquid chiller;

(b) The water vapor is drawn to the absorption zone end is absorbed in a strong absorbing solution such as 65% equeous lithium bromide solution. The absorbing solution is thereby diluted and becomes a weak absorbing solution, say 60% lithium bromide. The heat of absorption is released to a cooling water stream;

(c) The weak absorbing solution then enters the regeneration zone, wherein it is heated and vaporized to generate a second water vapor and becomes a strong absorbing solution that is heat exchanged and returned to the absorbing zone;

(d) The second water vapor is condensed by rejecting heat to a cooling water stream and the condensate formed is heat exchanged and returned to the evaporation zone.

The operations in a small conventional absorption air conditioner are similar to those of a larger unit described, except that the internal chilled water produced in the evaporation zone is circulated directly to an air handler.

In contrast, a system of the present invention uses one or more immediate Heat Upgrading Air Handlers, in which latent heat of vaporization is taken directly from indoor air or outdoor air without forming an intermediate chill water stream.

2B. Cool Thermal Storage

Chilled water, ice or a phase change material can be used as a cool storage medium. During a charging period, a cool storage medium is cooled and taken to a low enthalpy state, such as chilled water, ice, hydrate crystals; during a discharging period, the medium is heated and taken to a high enthalpy state. In contrast, during a charging period, the cool storing medium of a system of the present invention is taken to a high free energy state or a low entropy state, i.e. strong absorbing solution and water, and during a dis-charging period, the medium is taken to a low free energy state or a high entropy state, i.e. a weak absorbing solution. The conventional system are described as follows:

(a) Chilled Water Storage Systems

Conceptually, chilled water storage appears to be simple. The major drawback is that the mass of water needed to provide a given cool storage capacity is large. Water stores cooling capacity by a decrease in its temperature. Chilled water storage is traditionally designed on a 11.1° C. (20° F.) temperature rise. Therefore, it takes almost 283 liters (10 ft3) of water to provide one ton-hour of cool storage capacity.

(b) Static Ice Storage Systems

In a static ice storage system, ice is made on tubes by an indirect freezing operation and is melted in place by circulating water to thereby produce chilled water for air conditioning. The volume of ice must be permeated with channels of fluid to transport heat into and out of the body of ice. A major manufacturer of static ice storage systems is CALMAC Manufacturing Corporation of Englewood, N.J. CALMAC Corporation uses water chiller manufactured by Trane Company in its ice storage systems.

(c) Dynamic Ice Storage Systems

In a dynamic ice storage system, ice is produced by a flake ice machine and flake ice is stored in a vessel. A stream of circulating water is brought in contact with flake ice to be chilled and returned for cooling process equipment or a building. Major manufacturers of dynamic ice storage systems are Turbo Company in Denton, Tex. and Mueller Company in Springfield, Mo.

(d) Slushy Ice Storage Systems

In a slushy ice storage system, a slushy ice mixture is formed by an indirect freezing operation. A mass of slushy ice may be directly circulated for air conditioning or a water stream may be chilled by the slushy ice and used for air conditioning. Developers of slushy ice systems are Chicago Bridge and Iron Company in Chicago, Ill. and Sunwell Engineering Company in Canada.

(e) Eutectic Salt Storage Systems

Eutectic describes a mixture of compound easily fused or fusing at the lowest possible temperature. The eutectic salt used in thermal storage application is a salt hydrate that fuses at 47° F. In a crystalline form the salt crystallizes with several water molecules. In the amorphous form the salt dissociates from the water molecules, or "melts". Energy in the form of heat must be added to the hydrate to cause the dissociation.

Transphase Systems, Incorporated in Huntington Beach, Calif. is a major supplier of eutectic cool storage systems.

(f) Vacuum Ice Storage

A vacuum ice storage system has been invented by Chen-Yen Cheng and is described in U.S. Pat. No. 5,059,228 issued on Oct. 22, 1991. The system comprises a vacuum vessel, a multitude of adiabatic ice making trays, a set of con-denser tubes or plates and a set vapor generating surfaces. During a charging period, refrigerant liquid is vaporized inside of the condenser tubes or plates. A part of the water in the adiabatic trays vaporizes to cause remaining water to freeze on the trays and the vapor is desublimed on the condenser surfaces. During a dis-charging period, a mass of external water is heat exchanged with a mass o f internal water to cause vaporization of the internal water and thereby form a vapor which pressure is somewhat higher than the triple point pressure of water. The vapor so formed enters the adiabatic trays to melt the ice on the trays.

SUMMARY OF THE INVENTION

(Disclosure of the Invention)

The present invention is entitled "Immediate Heat Upgrading by Absorption". It consists of (1) taking in heat from a first mass of air at a first temperature by vaporizing a mass of water under a reduced pressure, (2) upgrading the heat by absorbing the water vapor into an absorbing solution and (3) discharging the heat of absorption at an elevated temperature to a second air mass or cooling water. The use of a chilled water loop is eliminated. As the results, Immediate Heat Upgrading Absorption Air Conditioning Systems (IHUA Systems). Immediate Heat Upgrading Air Handlers (IHUA air handlers), Modular Evaporation-Absorption Panels (E-A panels), Modular Evaporation-Absorption Heat Pipe Assemblies (E-A Heat Pipes), Modular Regeneration-Condensation Panels (R-C Panels), Modular Regeneration-Condensation Heat Pipe Assemblies (R-C Heat Pipes) and Combined Modular Evaporation Absorption and Regeneration-Condensation CEA-RC Panels) are herein introduced.

A basic IHUA system comprises (a) a first sub-system consisting of one or more IHUA air handlers, (b) a second subsystem for regenerating the working mediums and (c) a third subsystem for circulating the working medium. A comprehensive IHUA system further comprises a fourth subsystem for storing the working mediums. Thus, a comprehensive system also provides a cool thermal storage system. In an IHUA system, water and an absor-bing solution are stored and circulated and used as heat upgrading mediums. Entropy increase associated with diluting the absorbing solution provides the driving force for the immediate heat upgrading. In contrast to the present invention, a con-ventional absorption air conditioning system uses a chiller to produce a stream of chilled liquid, such as chilled water, which is circulated to remove heat from room air.

An IHUA air handler uses one or more E-A panels or one or more E-A heat pipe assemblies. An E-A panel has two closely spaced heat conductive walls forming an enclosure. An E-A heat pipe assembly comprises a number of evaporation-absorption heat pipes. In either an E-A panel or an E-A heat pipe assembly, there are a first falling-film zone (Zone 1), a second falling-film zone (Zone 2) and a vapor passage within the enclosure. There are a first heat interaction zone (Zone 3) and a second heat interaction zone (Zone 4) outside of the enclosure. In a summer operation, a mass of water is vaporized in Zone 1 to remove heat from indoor air in Zone 3; the vapor so formed is absorbed in an absorbing solution is Zone 2 and release the heat of absorption to outdoor air in Zone 4. In a Winter operation, a mass of water is vaporized in Zone 2 to take in heat from outdoor air in Zone 4; the vapor so formed is absorbed in an absorbing solution in Zone 1 and release the heat of absorption to the indoor air in Zone 3.

A R-C panel is similar in construction as an E-A panel; a R-C heat pipe assembly is similar in construction as an E-A heat pipe assembly. One or more R-C panels or heat pipe assemb-lies are incorporated into a regeneration unit to regenerate the absorbing solution.

One or more combined EA-RC panels or an EA heat pipe assembly and a R-C heat pipe assembly are used in constructing a complete IHUA air conditioning system for providing air conditioning for a maoving vehicle or a room. IHUA systems have the following major advantages:

1. Temperature lift, defined as the difference between the absorption temperature and the evaporation temperature is low.
2. E-A panels, R-C panels, EA-RC panels, E-A heat pipe asssemb-lies and R-C heat pipe assemblies can be mass produced.
3. E-A panels, R-C panels, EA-RC panels, E-A heat pipe asssemb-lies and R-C heat pipe assemblies are all hermetically sealed.
4. A common salt, such as $CaCl_2$ or $MgCl_2$, is used.
5. The systems can provide cool thermal storage by storing water and absorbing solutions.
6. Equipment cost and energy cost are low.
7. Operations are reliable.

BRIEF DESCRIPTION OF DRAWINGS

FIG. 3a shows that, during a period of time in summer, an IHUA air handler takes in heat from room air upgrades the heat and discharges the upgraded heat to outside air or cooling water immediately to establish room cooling. FIG. 3b shows that during a period of time in Winter, the IHUA air handler takes in heat from outside air or water, upgrades the heat and discharges the upgraded heat to room air immediately for room heating. Water and an absor-bing solution, such as an aqueous solution containing $CaCl_2$, are used as working mediums and are circulated through the IHUA air handlers. This is in contrast to a conventional absorption air conditioning system in which an absorption chiller is used to first produce a stream of chilled water at about 4.2° C. (40° F.) and the chilled water is circulated through air handlers in rooms to remove heat from room air and returned to the chiller at about 15.5° C. (60° F.). In s conventional system, an aqueous solution containing 60–65% LiBr is used as the absor-bing solution. Since water and an absorbing solution are directly circulated through an IHUA air handler without first producing a stream of chilled water, the temperature lift needed in; the heat upgrading is greatly reduced. Therefore, the concentration of the absorbing solution used is greatly reduced and an absorbing solution of $CaCl_2$ rather than LiBr may be used. There are great advantages in being able to use $CaC_2$ because of (a) lower cost, (b) ready availability and (c) non-toxicity.

An evaporation—condensation heat pipe (E-C heat pipe) assembly is similar to an E-A heat pipe assembly. It is use to evaporate a solution and condense the vapor formed. When an E-C heat pipe assembly is used in regenerating absorbing solution in an absorption refrigeration system, it may be referred to as a regeneration - condensation heat pipe (R-C heat pipe) assembly.

Figure 13:
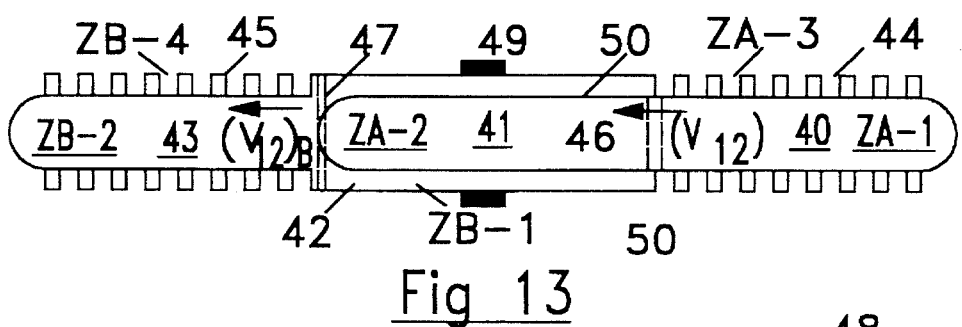

FIG. 13 illustrates the structure and operation of a Modular Double Effect Evaporation Condensation Panel (Double Effect E-C panel) which performs the functions of a double effect evaporator.

Figure 14:
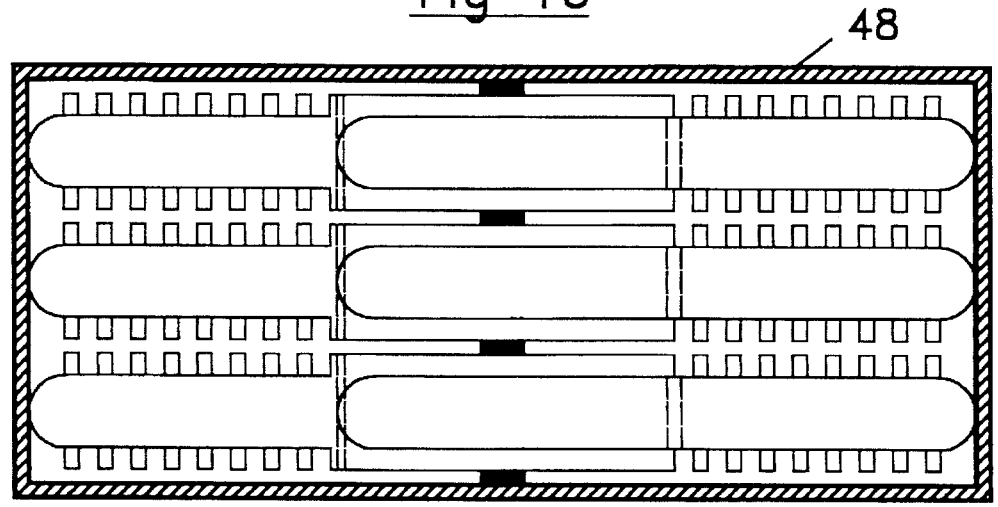

FIG. 14 illustrates a double effect evaporation unit that uses one or more Double Effect E-C panels. Used in an air conditioning system, they may be referred to as Double Effect R-C panels.

Figure 15A:
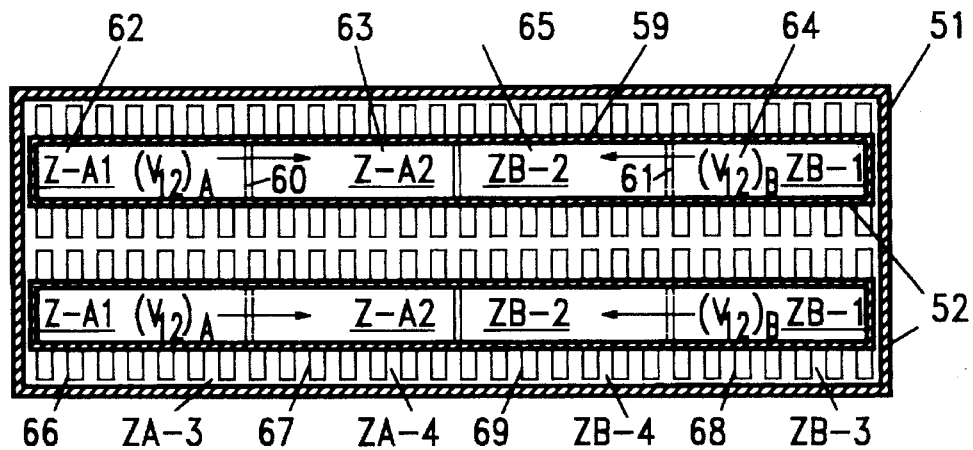

FIG. 15a illustrate the structure and operations of an Integrated Modular Evaporation—Absorption and Regeneration-Condensation Panel (EA-RC panel).

Figure 15B:
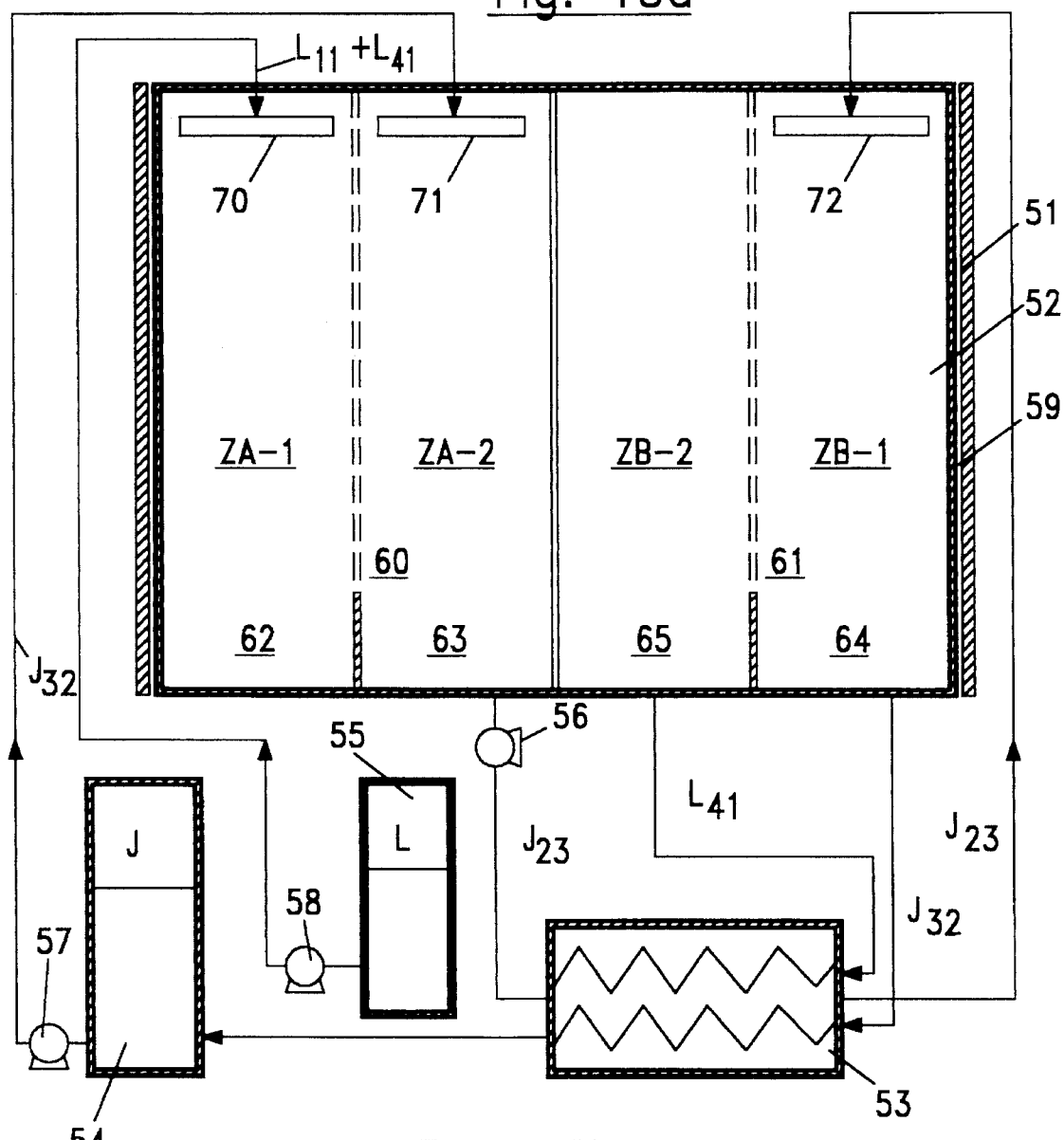

FIG. 15b also illustrate the layout of a complete absorption air conditioning and medium regeneration system using one or more EA-RC panels.

Figure 16:
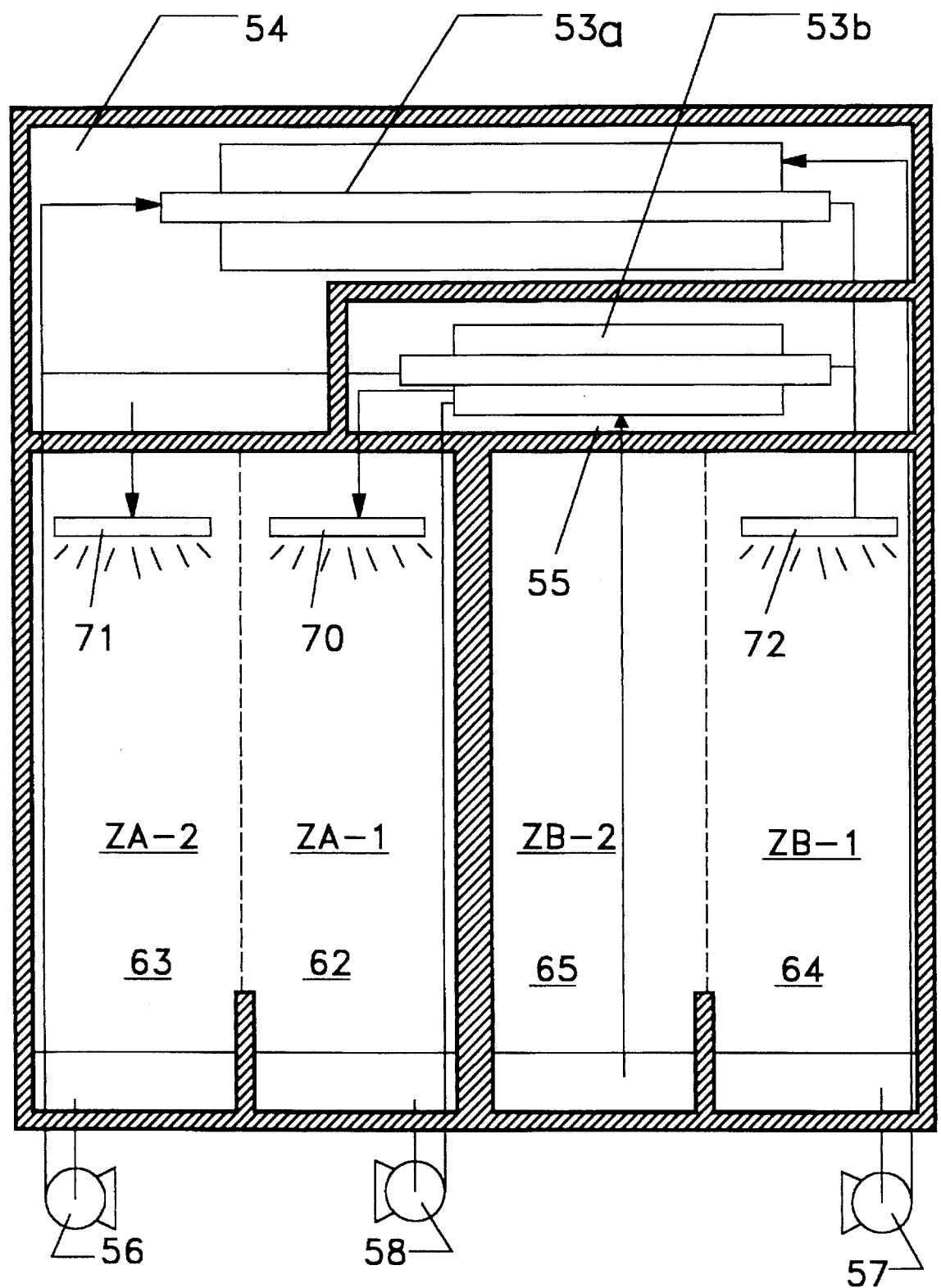

FIG. 16 illustrates an EA-RC panel which also includes heat exchangers and medium storages within the panel.

Figure 17:
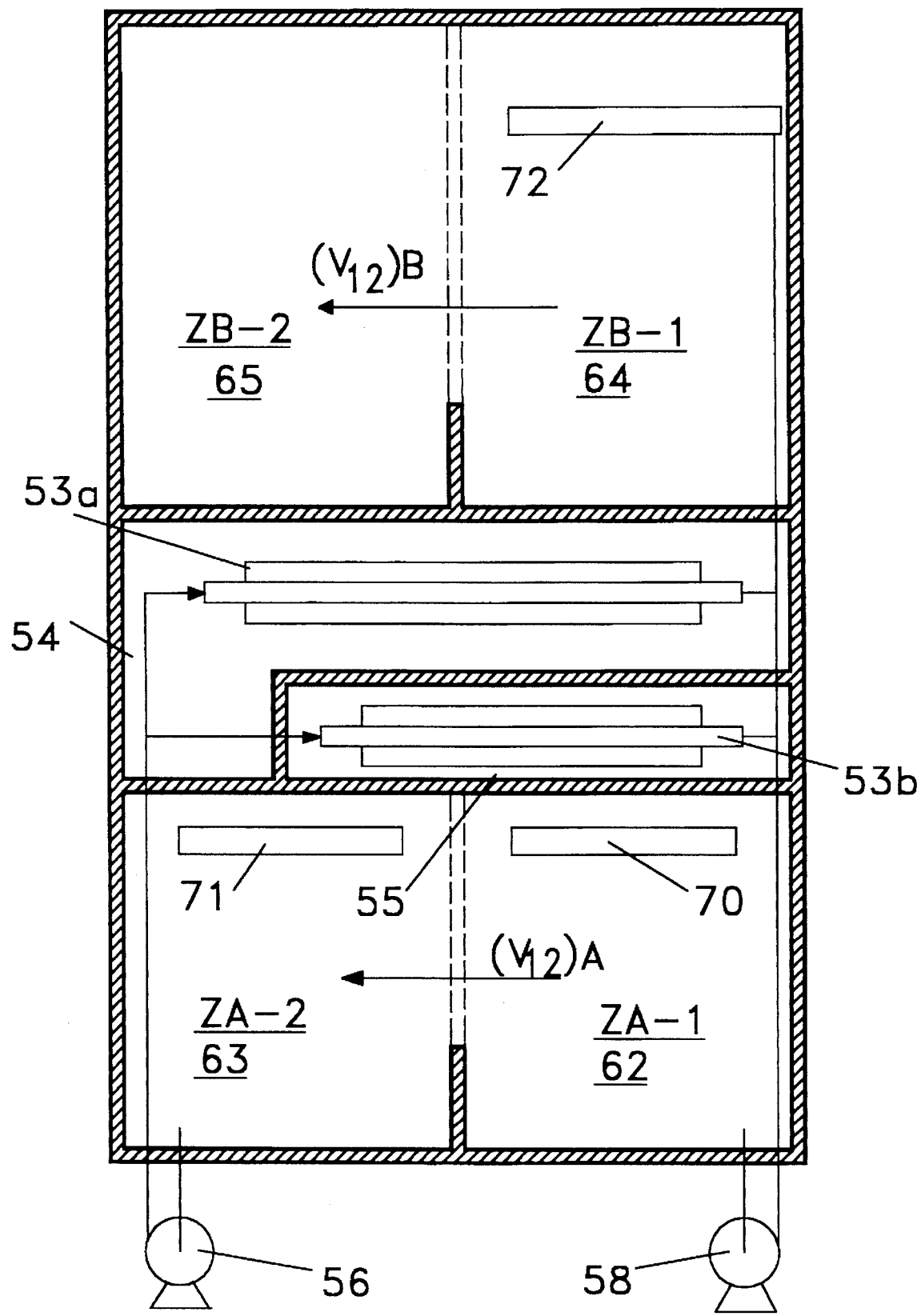

FIG. 17 illustrates another EA-RC panel similar to that of FIG. 16, except that the R-C portion of the panel is placed above the E-C portion of the panel and the heat exchangers and the medium storages are located in the middle portion of the panel.

Figure 18:
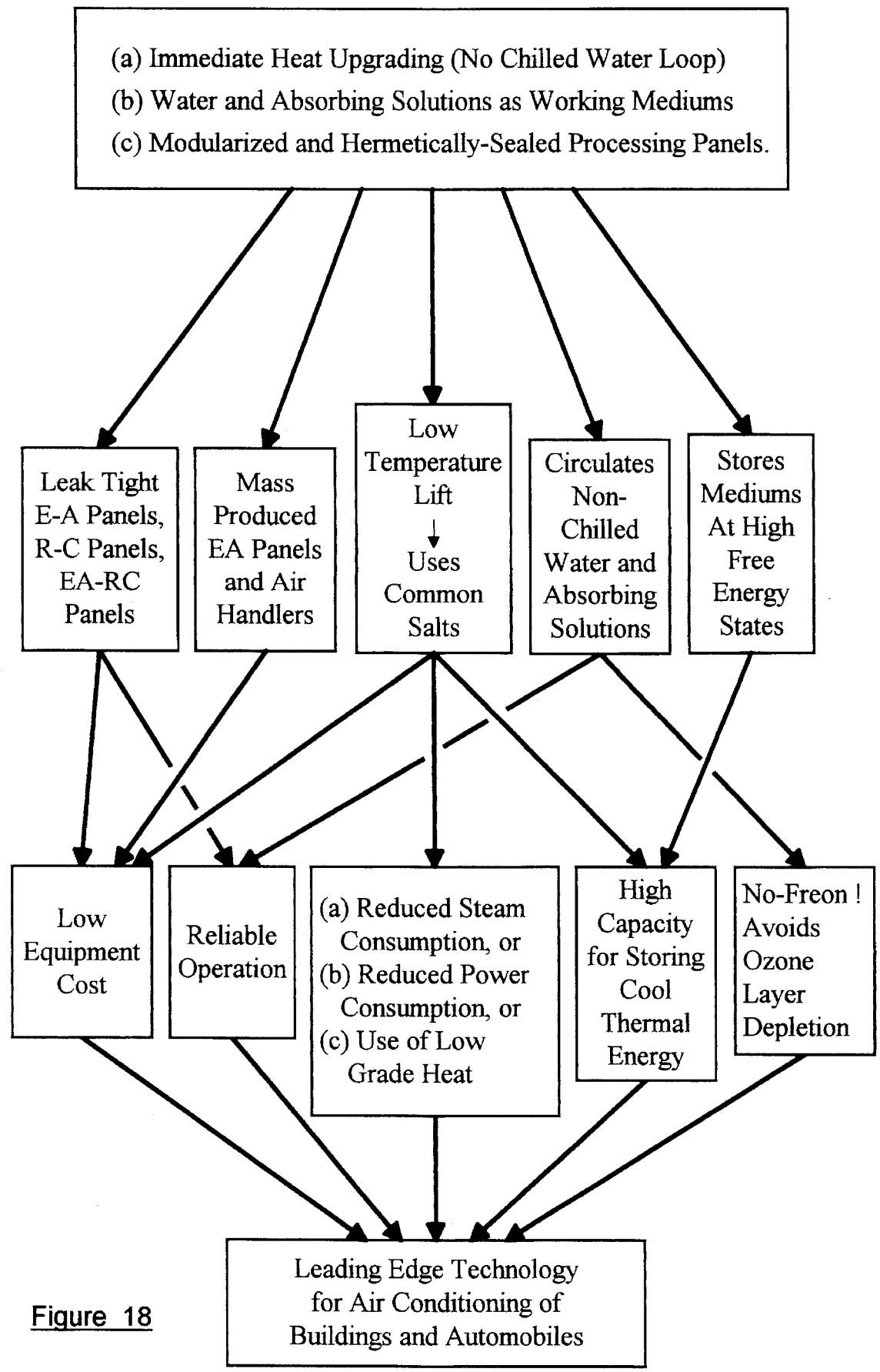

FIG. 18 summarizes the characteristic features and the advantages of the IHUA system.

PREFERRED EMBODIMENT OF THE INVENTION (Best Mode for Carrying Out the Invention)

An Immediate Heat Upgrading Absorption Air Conditioning System (IHUA System) and an Immediate Heat Upgrading Air Absorption Handler (IHUA air handler) are herein disclosed. In an IHUA air handler, heat taken in from a first air or water mass at a first temperature is subjected to an absorption heat upgrading and the upgraded heat is immediately discharged to a second air or water mass at a second temperature that is higher than the first temperature. Due to the "Immediate Heat Upgrading Operation," a chilled water loop commonly used in a conventional system is eliminated. Am IHUA system comprisis one or more IHUA air handlers, a regenerator, heat exchangers and medium storages. Water and an absorbing solution are circulated through an IHUA system. An IHUA system may be used for heating-and cooling a building, a moving vehicle, and an apparatus.

Figure 1:
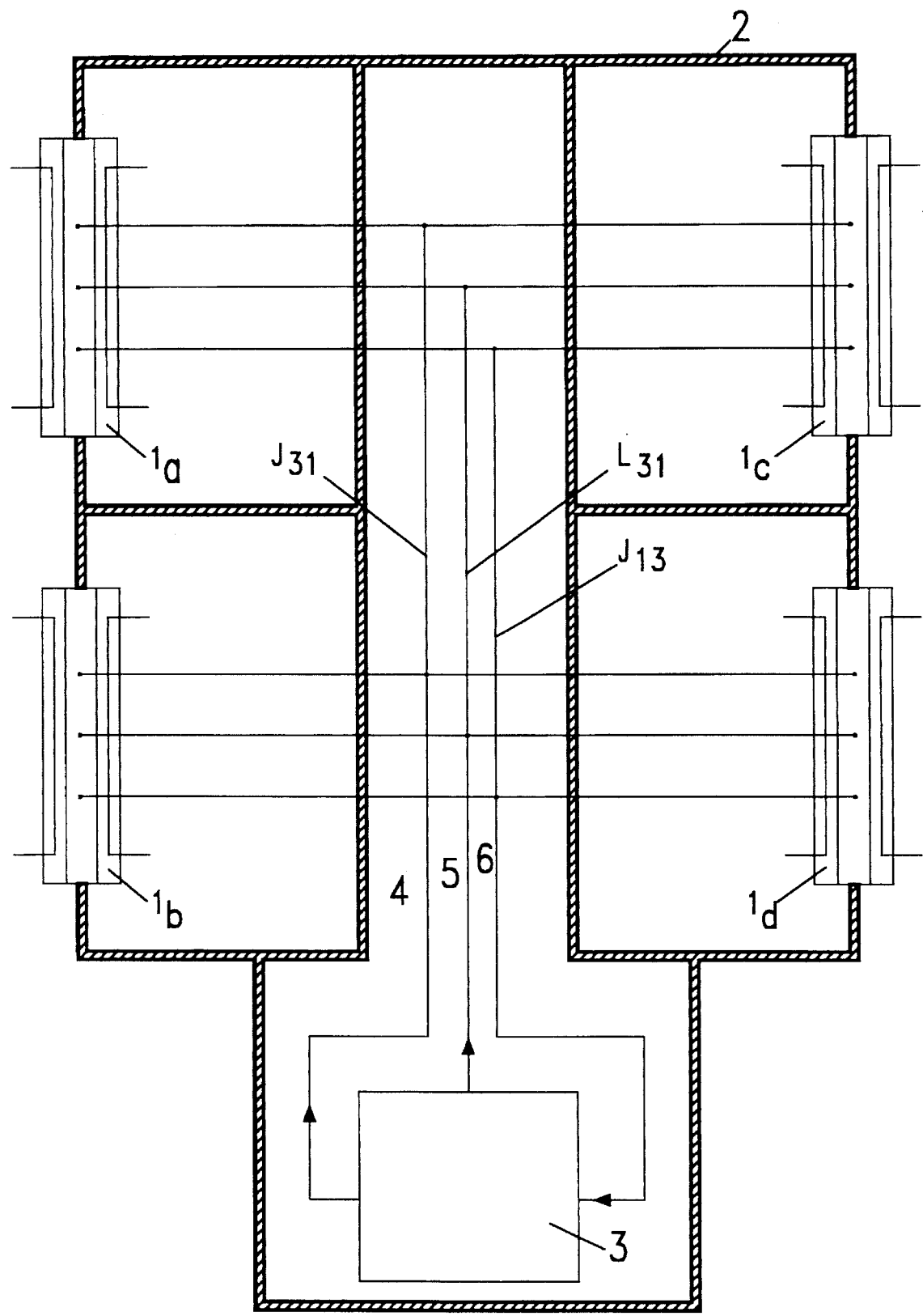
FIG. 1 illustrates the structure and operations of a basic Immediate Heat Upgrading Absorption Air Conditioning System (IHUA system). It comprises (a) a first sub-system that comprises one or more Immediate Heat Upgrading Absorption Air Handlers (IHUA air handlers) (b) a second sub-system for regenerating the working mediums and (c) a third sub-system for circulating the working mediums. An IHUA air handler takes in heat from a first air masss by vaporizing a mass of water, upgrade the heat by absorbing the vapor into an absorbring solution, and discharge the upgraded heat to a second air mass.

FIG. 1 illustrates a basic IHUA system used for cooling and heating a building. The system comprises a first subsystem having one or more IHUA air handlers 1a, 1b, 1c, 1d, installed in regions to be air conditioned in a building 2, a second subsystem 3 of regenerating a weak absorbing solution into a strong absorbing solution and a mass of water, and a third subsystem comprising conduits 4, 5, 6, and pumps (not shown) for delivering the strong absorbing solution $J_{31}$ and water $L_{31}$ to the air handlers and returning the weak absorbing solution $J_{13}$ to the regeneration subsystem. During a period of time in Summer, heat is taken from indoor air by the IHUA air handlers, the heat is upgraded by absorption, and the upgraded heat is discharged to the outdoor air or water immed-iately. During a period of time in Winter, heat is taken in from outdoor air or water by the IHUA air handlers, the heat is upgraded by absorption, and the upgraded heat is supplied to the indoor air immediately.

Figure 2:
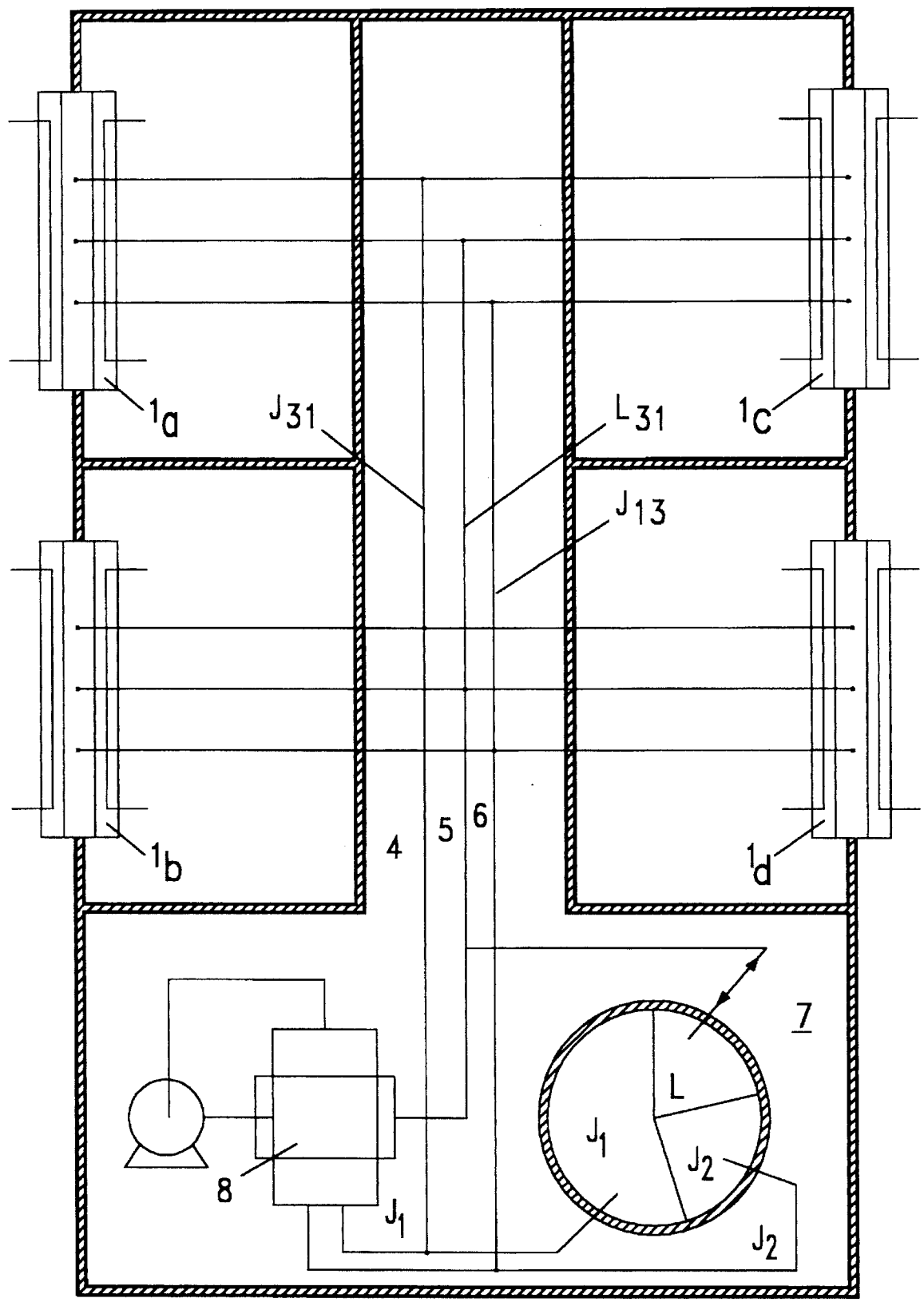
FIG. 2 illustrates a comprehensive IHUA system that further comprises a fourth subsystem for storing the working mediums.

FIG. 2 illustrates the structure and operations of a comprehensive IHUA system. The system comprises a first sub-system having one or more IHUA air handlers 1a, 1b, 1c, 1d, a second sub-system 7 comprising a vapor compression evapotator 8 and an integrated medium storage 9, and a third sub-system comprising conduits 4, 5, 6, and pumps (not shown) for delivering a strong absorbing solution and water to the IHUA air handlers and returning the weak absorbing solution to the regenerator. Regeneration of an absorbing solution can be accomplished by using an evaporator. One may use a single effect evaporator, a multiple effect evaporator, or a vapor compression evaporator. In the system illustrated, a vapor compression evaporator is shown.

In a basic IHUA system, there is no medium storage therefore, the weak absorbing solution is regenerated into the strong solution and water, which are returned to the IHUA air handlers immediately. In a comprehensive system, there are storages for the strong absorbing solution, the weak absorbing solution and the water. One may use an integrated storage 9 that store all the three liquids in a single vessel. Because of having medium storages, regeneration of the absorbing solution does not have to take place immediately. In other words, air condition takes place during a first period of a day, say daytime, and the weak absorbing solution is concentrated during a second period of the day, say night time. Therefore, a comprehensive IHUA system also serves as a cool thermal storage system for power leveling.

It is important to note the following major differences between an IHUA system and a conventional system:

(a) In an IHUA system, a strong absorbing solution and water are introduced into air handlers. Vaporization of water and absorption of the vapor into the strong absorbing solution provide the driving forces for the heat upgrading. As the result, water and the strong absorbing solution become the weak absorbing solution. From the standpoing of thermodynamics, the entropy increase associated with mixing provides the driving force for the heat upgrading.

(b) In a conventional absorption system, an absorption chiller is used to produce a stream of chilled water, say at 4.44° C.(40° F.), the chilled water is delivered to air handlers to cool the indoor air and become heated to say 15.55° C.(60° F.), and the heated water is returned to the chiller to be cooled.

It is also important to compare the cool storage of the present system and the conventional cool storage systems.

Conventional cool storage systems are (a) Chilled water storage system, (b) Ice storage systems and (c) Hydrate crystal storages system. These systems may be referred to as low enthalpy state cool storages, because, in each of these systems, a medium is taker: to a low enthalpy state. In contrast, the cool storage of the present system may be referred to as a low entropy state cool storage, because the mediums are stored as a concentrated absorbing solution and water, which are in a low entropy state compared to the weak absorbing solution produced during an air conditioning period. In the cool thermal storage technology, the first important factor is the amount of heat that can be removed in the air conditioning unit per unit mass of cool storage medium store. This factor is referred to as Unit Cool Thermal Energy Storing Capacity (CTE Storing Capacity). The CTE Storing Capacity of an IHUA system can be found from the heat removed from an air mass to be cooled by vaporizing a given amount of water and the amount of absorbing solution used to absorb the vapor and is therefore related to the solute concentrations in the strong absorbing solution and the weak absorbing solution. When these concentrations are 55% and 50%, respectively, the CTE Storing Capacity is 53.5 kcal/kg or 96 Btu/lb: when these concentrations are 55% and 47%, the CTE Storing Capacity is 85.55 kcal/kg or 153 Btu/lb. In addition, in an IHUA system, the stored medium can be nearly completely utilized. Therefore, the medium utili-zation factor is very high. It can be seen that the CTE Storing Capacity for an IHUA is quite high compared with an ice storing system and a eutectic salt system in comparison, the ideal CTE Storing Capacity for storing ice is 80 kcal/kg or 144 Btu/lb , and the actual CTE Storing Capacity, assuming the utilization factor is 80%, is only 64 kcal/kg or 115.2 Btu/lb. The ideal CTE Storing Capacity for storing a eutectic salt is only 22.8 kcal/kg or 41 Btu/lb. Assuming that the utilization factor is 80% , the actual CTE Storing Capacity for a eutectic salt storage system is only 18 kcal/kg or 32.8 Btu/lb. In an ice storage or a eutectic salt storage system, not all of the water or salt stored is frozen or melted. The utilization factor is to account for the incomplete freezing and melting.

The second important factor in the cool thermal storage technology is the energy consumption for storing a unit of cooling capacity. The energy consumption in storing ice is very high because the freezing temperature of water is so much lower than the desired air conditioning temperature. The energy consumption for a eutectic salt storage system is considerably lower than that of an ice storage system because the phase change temperature is higher. The energy consumption for an IHUA system is also considerably lower than that of an ice storage system.

It is seen that the cool thermal storage system provided by an IHUA system has a high CTE Storing Capacity and requires low energy consumption. Therefore, an IHUA system provides a superb cool thermal storage system.

Figure 3:
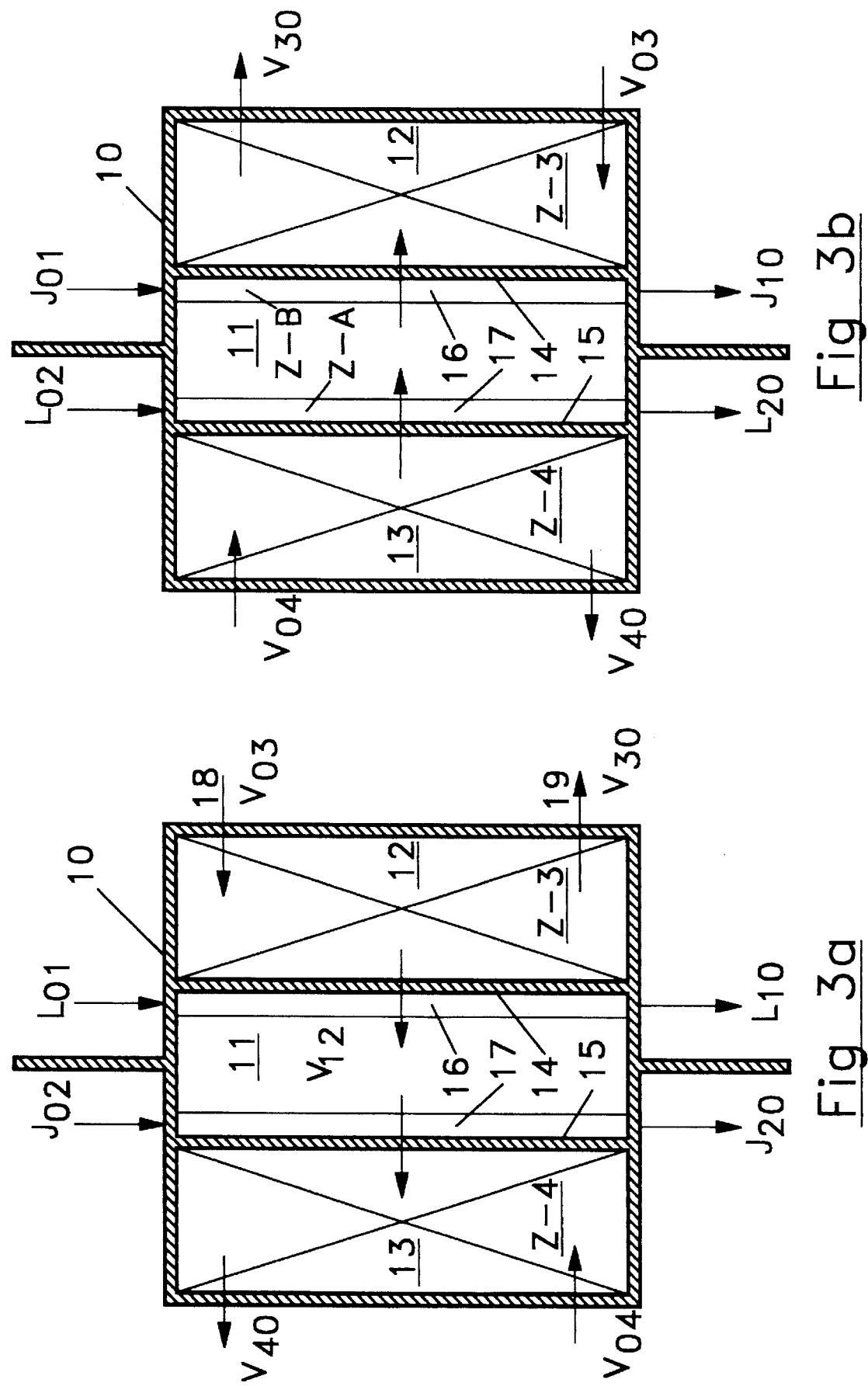
FIGS. 3a and 3b illustrate the structure and operations of a generic IHUA air handler.

FIGS. 3a and 3b illustrate the structure and operation of a generic IHUA air handler. FIG. 3a illustrates the operations during a period of time in Summer; FIG. 3b illustrates the operations during a period of time in Winter.

The air handler comprises an enclosure 10, a heat upgrading compartment 11, an indoor fin assembly 12 and an outdoor fin assembly 13. The heat upgrading compartment 11 is encolsed by two vertical walls 14, 15 and a first liquid film 16 and a second liquid film 17 are formed on the surfaces. The indoor fin assembly 12, provides heat transfer passage between the indoor air and the first liquid film; the outdoor fin assembly provides heat transfer passage between the outdoor air and the second liquid film.

FIG. 3a illustrates the operations during a period of time in the Summer. Water L01 and a strong absorbing solution J02 are applied on the two walls of the heat upgrading compartment 14, 15, to respectively form a first liquid film 16, and a second liquid film 17. The two zones enclosing the two liquid films are respectively referred to as zone 1, 16, and zone 2, 17. In operation, indoor air $V_{03}$, 18 is introduced into the indoor fin assembly 12 in zone 3 and thereby cooled and discharged as $V_{30}$, 19. The heat released by the indoor air is transmitted through the fin assembly to the first liquid film to vaporize water and thereby form water vapor $V_{12}$ and remaining water $L_{10}$, which is recycled. The water vapor is absorbed into the absorbing liquid film. The absorbing solution introduced $J_{02}$ is thereby diluted and becomes a weak absorbing solution $J_{20}$. The heat of absorption released is discharged to the outdoor air $V_{04}$ through the outdoor fin assembly 13 in Zone 4. Therefore, heat is taken in from the indoor air, upgraded immediately, and the upgraded heat is discharged to the outdoor air immediately. Dilution of the absorbing solution provides the driving force for the heat upgrading. FIG. 3b illustrates the operations of the IHUA air handler during a period of time in Winter. The operations are similar to those of the Summer operations, except that heat is taken in from the outdoor air, upgraded immediately, and the upgraded heat is discharged to the indoor air immediately and that the absorbing solution and water are respectively applied to the first surface in Zone 1 and the second surface in Zone 2.

Figure 4:
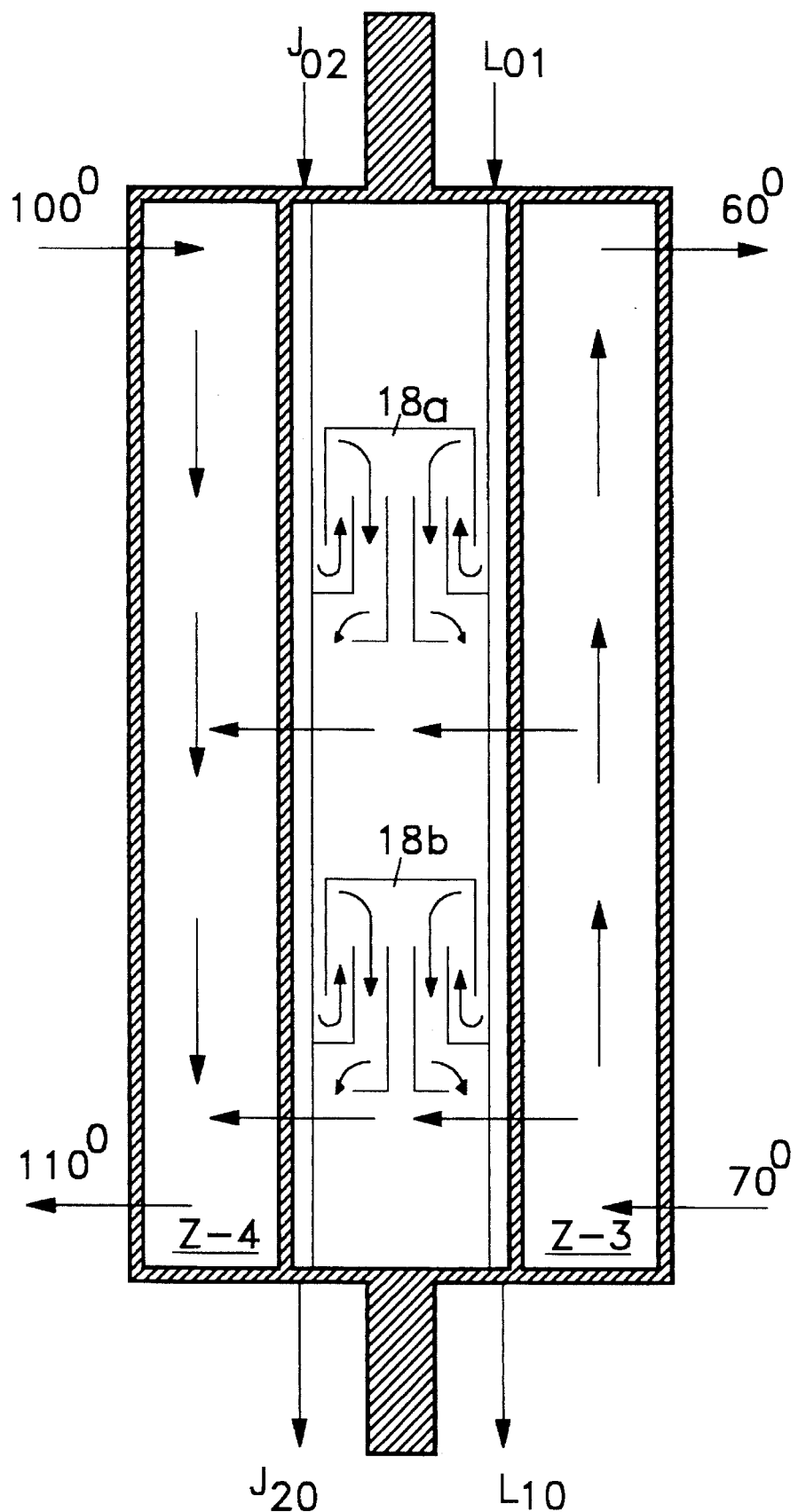
FIG. 4 illustrates a Multiple Pressure Zone IHUA air handler. It has several compartments within the panel so that evaporation of water and absorption of vapor take place at several different pressures. A less concentrated absorbing solution can be used as a working medium compared to that used in a single pressure zone IHUA air handler.

FIG. 4 illustrates a multiple pressure zone generic IHUA air handler. In this unit, the heat upgrading compartment is divided into two or more pressure zones by installing pressure isolating units 18a, and 18b. By installing one or more of these units, evaporation of water and absorption of the vapor into absorbing solution take place at two or more different pressures. It will be shown that a multiple pressure zone air handler has several important advantages over a single pressure zone air handler.

The temperature lift of an absorption heat upgrading system is defined as the difference between the absorption temperature and the evaporation temperature. In a system with a high temperature lift, say 45° C. or more, a highly concentrated absorbing solution, such as 60%–65% LiBr, is used. In a system with a low temperature lift, say less than 30° C., an aqueous solution of a common salt, such as $CaCl_2$ or $MgCl_2$, may be used.

Figure 5A:
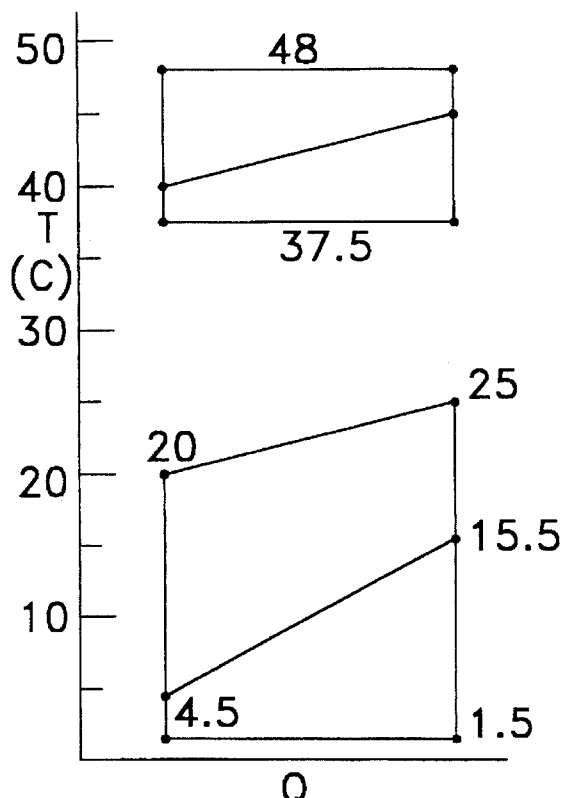
FIG. 5a illustrates the temperature distributions in a conventional large scale absorption air conditioning system using an absorption chiller. It shows that the temperature lift, defined as the difference between the absorption temperature and evaporation temperature, is around 46° C.

Temperature distributions in several system are illustrated in FIGS. 5a, 5b, 5c, and 5d. FIG. 5a illustrates the temperature distributions in a large absorption chilled system. It shows that chilled water at 4.5° C. (40.1° F.) is produced in the chiller. The chilled water exchange heat with room air, thereby the water is heated to 15.6° C. (60° F.) and the room air is cooled from 25° C. to 20° C. In the chiller, water vaporizes at 1.5° C. to chill the water. A LiBr solution is used to absorb the water vapor at 48° C. and release heat to a cooling water stream which enters at 40° C. and leaves at 45° C. The heated water is cooled in a cooling tower by releasing heat to air at 37.5° C. In this system, the temperature lift is 48° C.–1.5° C.=46.5° C., which is high. For this system, an aqueous solution of LiBr is used as the absorbing solution.

Figure 5B:
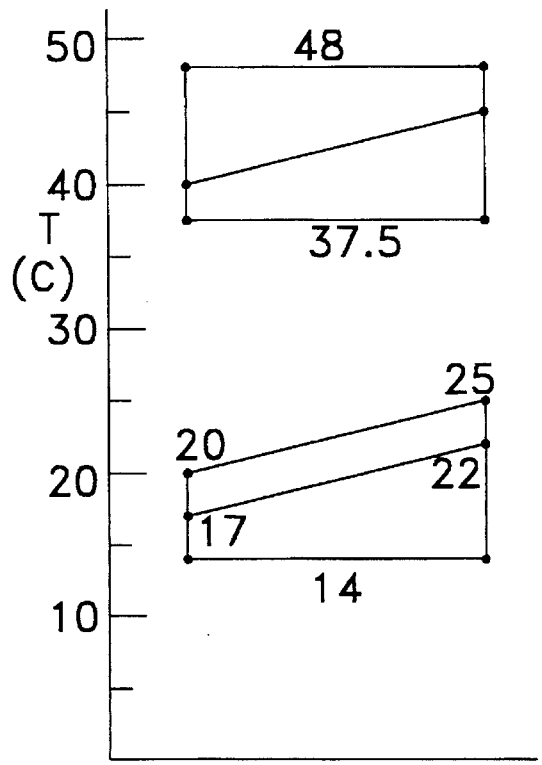
FIG. 5b illustrates the temperature distribution in a conventional small scale absorption air conditioning system. It shows that the temperature lift is around 34° C.

FIG. 5b illustrates temperature distributions in a small scale conventional absorption air conditioning system. In this system, the regeneration sub-system is at a short distance away from the air handlers. A stream of chilled water is produced by vacuum flash vaporization and circulated immediately. The evaporation temperature is around 14° C., and the absorbing temperature is around 48° C. Therefore, the temperature lift is 48° C. –14° C.=34° C.

Figure 5C:
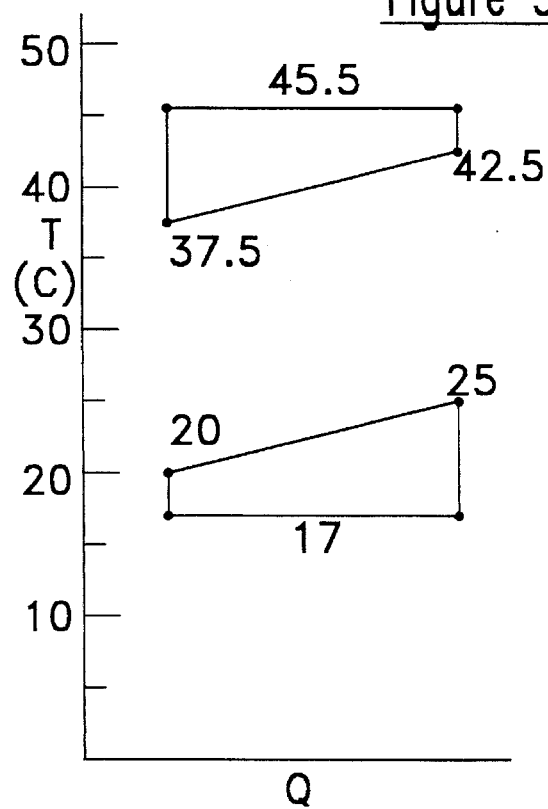
FIG. 5c illustrates the temperature distributions in a single pressure zone IHUA air handler. It shows that the temperature lift is around 28.5° C.

FIG. 5c illustrates temperature distributions in a single pressure zone IHUA air handler. It shows that water is evaporated under a single pressure at 17° C. to cool an air stream from 25° C. to 20° C. The vapor is absorbed into an absorbing solution in a single pressure zone-at 45.5° C. so that the heat of absorption is discharged to an outdoor air to thereby heat it from 37.5° C. to 42.5° C. There is no intermediate chill water loop. The temperature lift is 45.5° C. –17° C.=28.5° C. For this system, an absorbing solution containing $CaCl_2$ can be used.

Figure 5D:
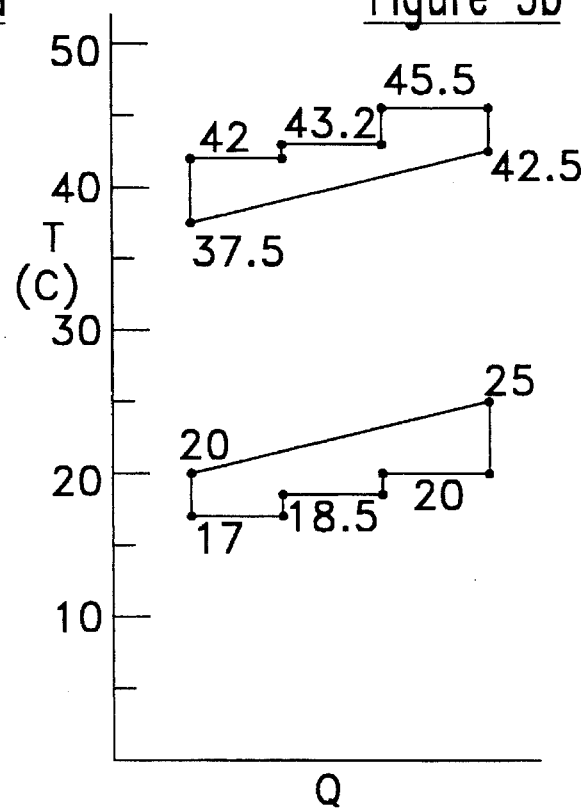
FIG. 5d illustrates the temperature distributions in a three pressure zone IHUA air handler. It shows that the temperature lift is around 25.5° C. In a system with a low temperature lift, an aqueous solution of a common salt, such as $CaCl_2$ or $MgCl_2$, may be used as the absorbing solution.

FIG. 5d illustrates temperature distributions in a multiple pressure zone IHUA air handler. It shows that water is evaporated under three different pressures so that the evaporation temperatures are 17° C., 18.5° C. and 20° C. respectively and the vapors are absorbed at 42° C., 437.° C. and 45.5° C. respectively. The temperature lifting at the last stage is 45.5° C. –20° C. =25.5° C. For this system, an absorbing solution containing CaCl2 can be used.

It has been shown that the temperature lift required in a multiple pressure zone air handler is several degrees lower than the temperature lift required in a single pressure zone air handler. Therefore, a less concentrated absorbing solution can be used. Furthermore, this leads to a significant energy saving in the regeneration operation.

Figure 6:
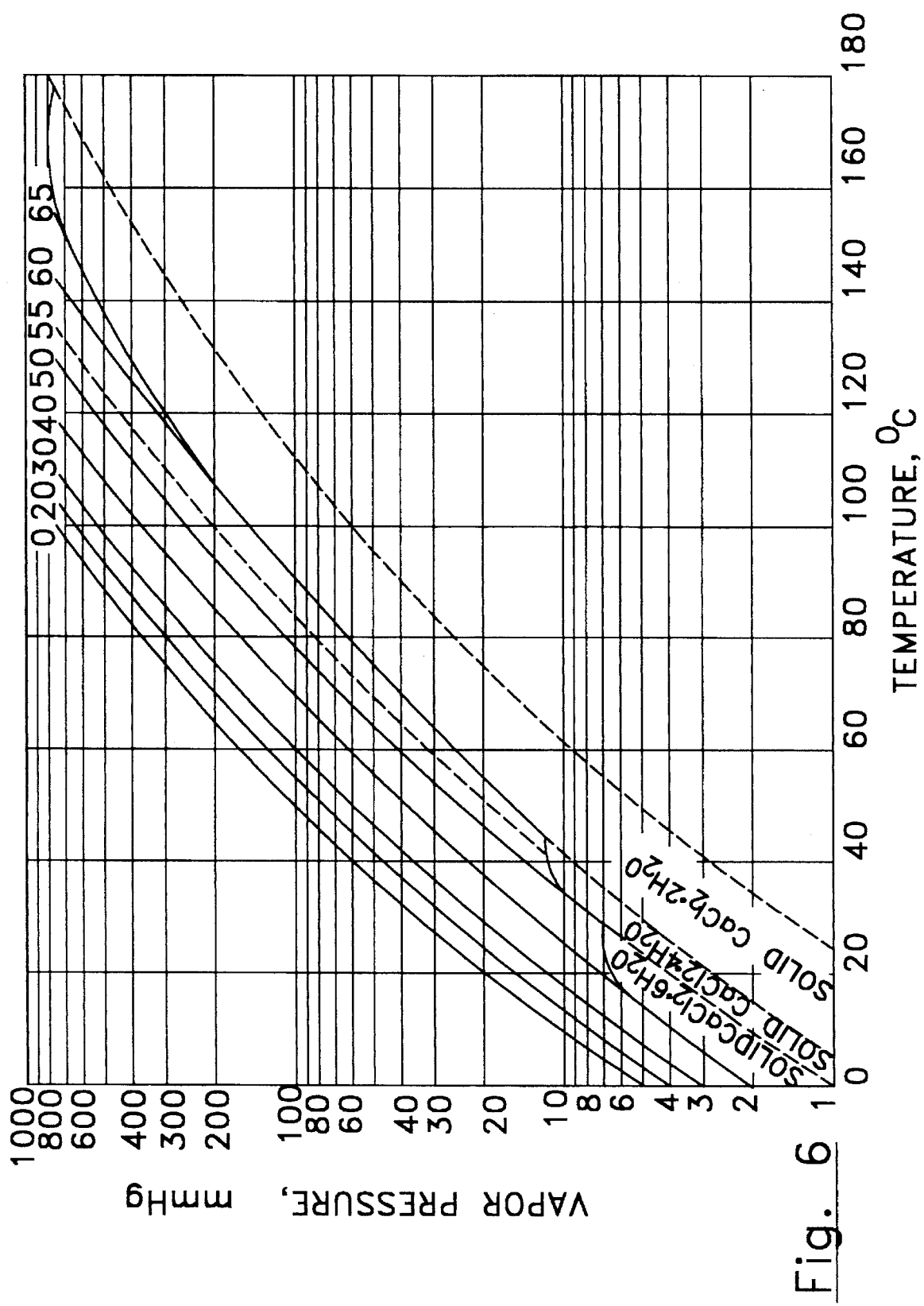
FIG. 6 shows a phase diagramof $CaCl_2$—$H_2O$ system. One can plot the conditions under which evaporation and absorption take place in a given air handler to determine the concen-trations of absorbing solutions to use.

FIG. 6 shows a phase diagram of $CaCl_2$—$H_2O$ system taken from Calcium Chloride Handbook, published by Dow Chemical Corp. in-Michigan, U.S.A. It shows vapor pressure lines for water and aqueous Calcium Chloride solutions of various concentrations and vapor pressures of saturated solutions with respect to $CaCl_2$—$6H_2O$, $CaCl_2$—$4H_2O$ and $CaCl_2$—$2H_2O$ at various temperatures. One can plot the conditions under which evaporation and absorption take place in various types of air handlers and detenmines the concentrations of the absorbing solutions to be used in these systems. It can also be shown that when the temperature lift is high, such as 50° C., aqueous solution of $CaCl_2$ can not be used because of formation of one or more hydrates of calcium chloride.

Two types of Modular Evaporation-Absorption Panels (E-A panels) are introduced. An E-A panel has an evaporation zone, an absorption zone and a vapor passage within the enclosed region. An E-A panel is used for heat interactions and immedi-ate heat upgrading. In a Type A E-A panel, the evaporation zone and the absorption zone are in side-by-side arrangement; in a Type B E-A panel, the evaporation zone and the absorption zone area in face-to-face arrangement. An IHUA air handler uses one or more E-A panels. The E-A panel may also be referred to as immediate Heat Upgrading Absorption Panels and designated as IHUA panels.

Figure 7A:
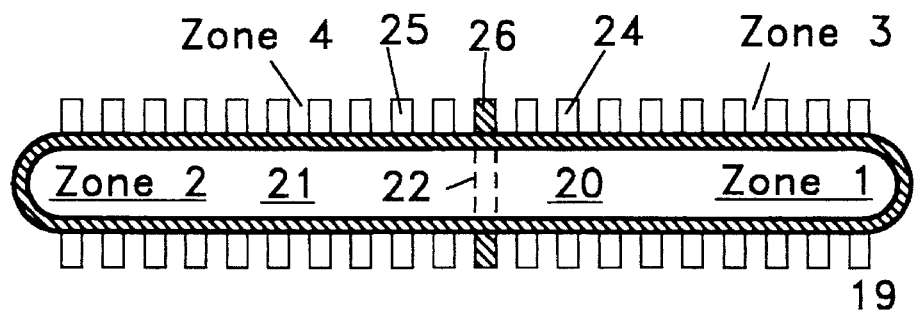
FIG. 7 illustrates the structure and operation of a Type-A Modular Evaporation Absorption Panel (E-A panel). An E-A panel is used for heat interactions and immediate heat upgrading. An E-A panel has an enclosure enclosed by two closely spaced heat conductive walls and has an evaporation zone, an absorption zone and a vapor passage inside of the enclosure, and a first heat interaction zone with a first fin assembly and a second heat interaction zone with a second fin assembly outside of the enclosure. A Type A panel is a side-by-side panel in which the evaporation zone and the absorption zone are separated in the width direction; a Type B panel is a face-to-face panel in which the two zones are separated in the thickness direction.
Figures 7B, 7C:
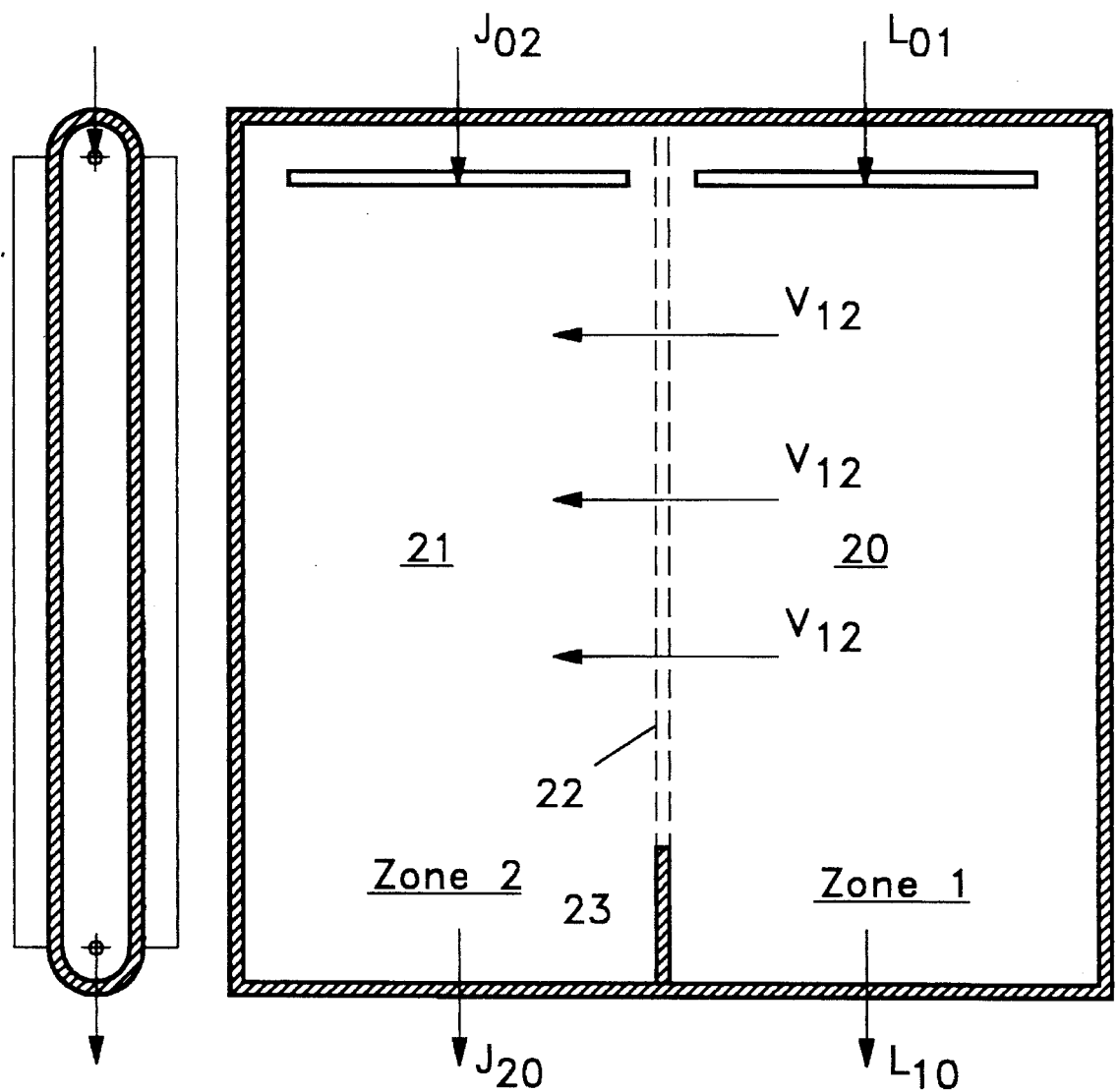

FIGS. 7a, 7b and 7c respectively illustrate a horizontal corss section, a vertical cross section and a side cross section of a Type A E-A panel. It has an enclosure 19 having two closely spaced heat conductive walls. The enclosed space may be referred to as a heat upgrading compartment. The enclosed region is divided into a first falling liquid film zone (zone 1) 20 and a second falling liquid film zone (Zone 2) 21 by a perforated partition 22 which serves as an entrainment separator. There is a liquid barrier 23 at the bottom of the enclosed space to prevent the two liquid masses in the two zones from mixing. There is a spray device 27 in zone I to distribute a liquid to form a falling liquid film; there is another spray device 28 in zone 2 to distribute another liquid to form another falling liquid film. There is a first external region (zone 3) 24 and a second external region (zone 4) 25 and a barrier 26 separating the two zones. One may install a fin assembly in zone 3 to enhance heat transfer; one may also install a fin assembly in zone 4 to enhance heat transfer.

It has been described earlier, by referring to FIGS. 4, 5c and 5d, that a multiple pressure zone IHUA air handler has advantages over a single pressure zone unit. An air handler with pressure isolating units has been illustrated by FIG. 4. A first way to produce a multiple pressure zone E-A panel, or R-C panel to be described, can be explained by referring to FIG. 7c. When the two closely spaced heat conductive walls that are used in constructing an E-A panel or R-C panel are corrugated plates with horizontal grooves. The panel would have multiple horizontal mini compartments separated by horizontal constricted regions. As a mass of liquid falls inside of the panel, pools of the liquid are formed above the constricted regions to provide liquid seals for maintaining pressure differentials between neighboring horizontal mini-compartments. A small gap is provided in a constricted region to allow liquid to pass through. Liquid films of water and absorbing solutions are formed in each mini-compartment of an E-A panel, so that the water vapor formed in the evaporation zone of a mini-compartment flows horizontally to the absorption zone of the same mini-compartment to be absorbed therein. Similar operations take place in a R-C panel. Water vapor formed in the regeneration zone of a mini-compartment flow to the condensation zone of the mini-compartment to be condensed therein.

A second way is to place horizontal flat bars insids of an E-A panel or a R-C panel to divide the inside space into multiple mini-compartments. Vapor flows within each mini-compartment in the horizontal direction and liquid flows down through edges of the horizontal flat bars.

Figure 8:
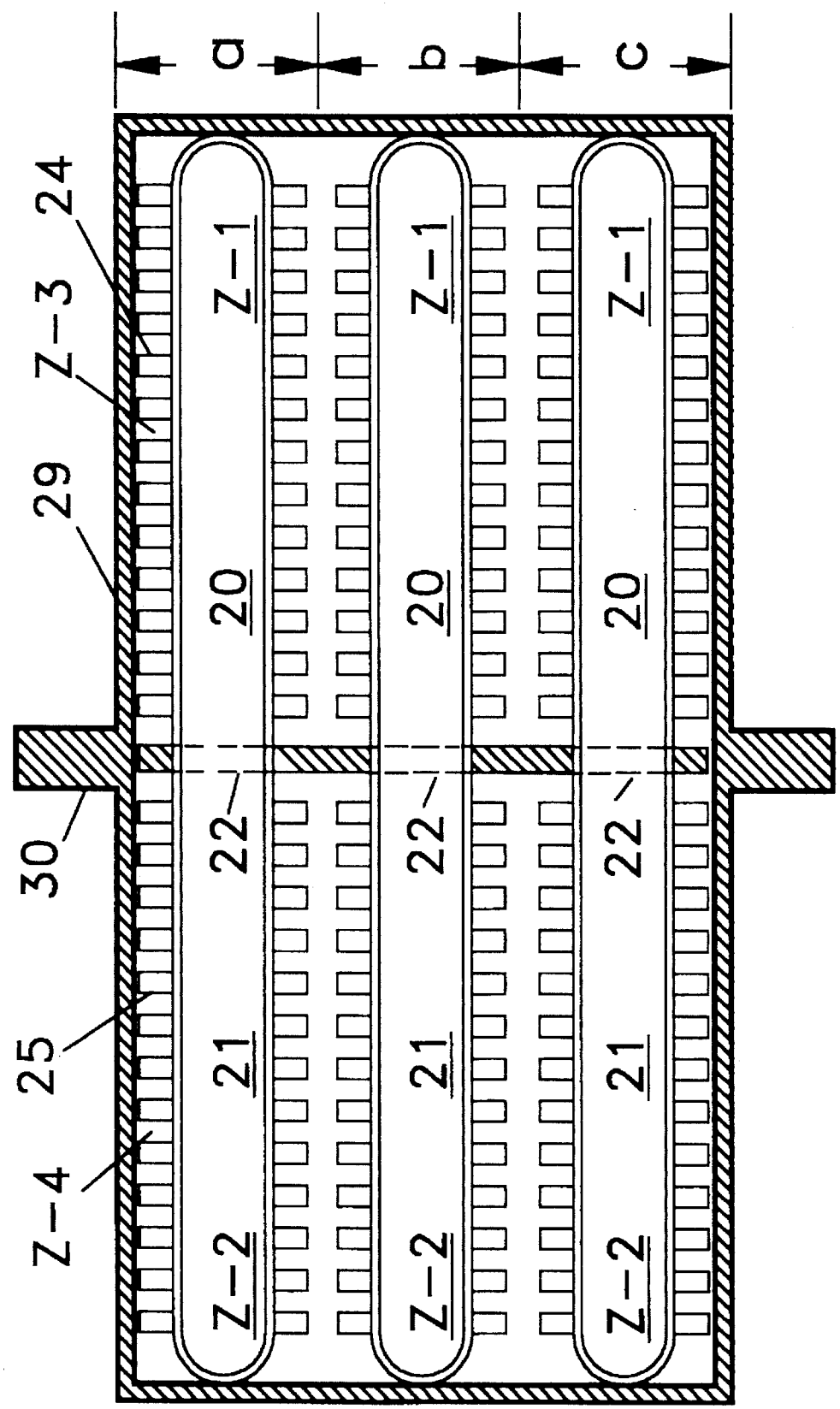
FIG. 8 illustrates the structure and operations of an IHUA air handler that uses one or more Type A E-A panels. The structure and operations of an IHUA air handler that uses one or more Type B E-A panels are similar to those illustrated by FIG. 8.

FIG. 8 illustrates the structure and operations of an IHUA air handler using several Type A E-A panels. The air handler has an enclosure 29 and three Type A E-A panels The air handler is installed on a wall 30, so that zone 1 and zone 3 are inside of the building and zone 2 and zone 4 are outside of the building. In a Summer operation, indoor air is introduced into zone 3, outdoor air is introduced into zone 4, water is sprayed into zone and an absorbing solution is sparyed into zone 2. Indoor air transfers heat through the first fin assembly in zone 3 and to the falling water film in zone 1 to vaporize water and form water vapor $V_{12}$. The indoor air is thereby cooled. The water vapor flows from zone 1 to zone 2 and is absorbed into the absorbing solution. The heat of absorption is transferred from zone 2 to the outdoor air in zone 4 through the second fin assembly. Therefore, the heat taken from indoor air is upgraded by the evaporation and absorption operations and the upgraded heat is discharged to the outdoor air immediately. During a period in time in Winter, water is introduced into zone 2 and an absorbing solution is introduced into zone 1. Heat is taken in from outdoor air, upgraded, and the upgraded heat is given to the indoor air. It is seen that the air handler can be used for both cooling and heating a room by simply switching the flows of water and absorbing solutions into zone 1 and zone 2. There are ways of modifying the structure illustrated by FIG. 8. For instance, one may use a structure having a central passage and having Z-1 zones and Z-2 zones stretching out to the right side and left side respectively from the central passage. This structure is similar to the structure of FIG. 8 with the panels connected in the middle part.

The structure of a Type B E-A panel is very similar to that of a Type A panel, except that the enclosed space is divided into an evaporation zone and an absorption zone by a perforated partition that is extended in the width direction. The operetions of an air handler using one or more Type B E-A panels are similar to the operations of an air handler using Type A E-A panels.

Figure 9A:
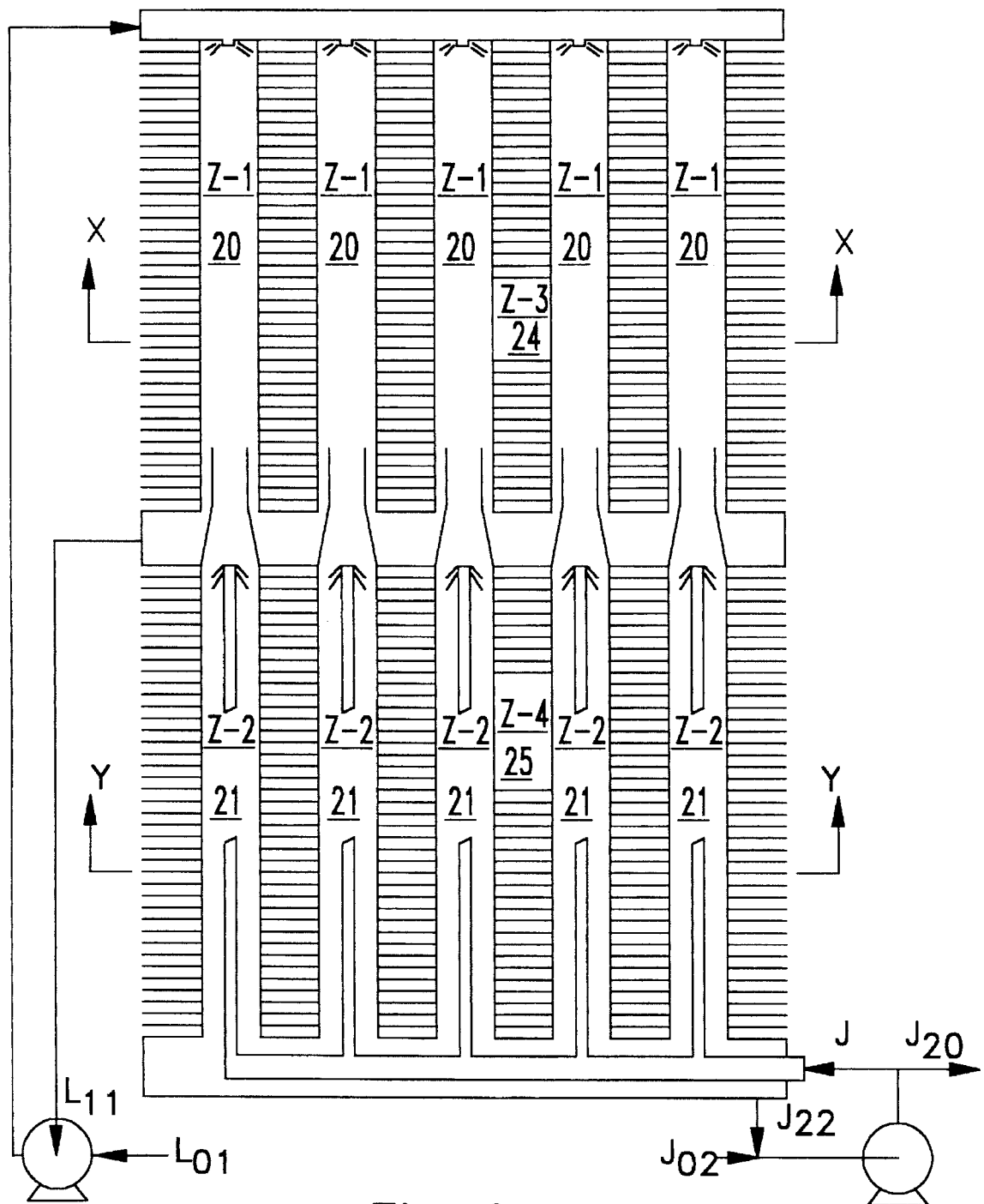
FIG. 9a illustrates a horizoneal cross section taken at a point in the evaporation zone.

FIG. 9a illustrates a vertical cross section of an IHUA air handler that comprises one or more E-A heat pipe assemblies. Each E-A heat pipe assembly has evaporatin Zones 20 (Z-1) and absorption Zones 21 (Z-2) inside of the heat pipes and a first fin assembly in the first external Zone 24 (Z-3) and a second fin assembly in the second external Zone 25 (Z-4). A falling water film is formed in Zone 1 of each heat pipe; a falling liquid film of an absorbing solution is formed in Zone 2 of each heat pipe; air to be cooled is admitted into Zone 3; air to remove heat is admitted into Zone 4. The operations of this system are similar to the system of FIGS. 7 and 8.

Figure 9D:
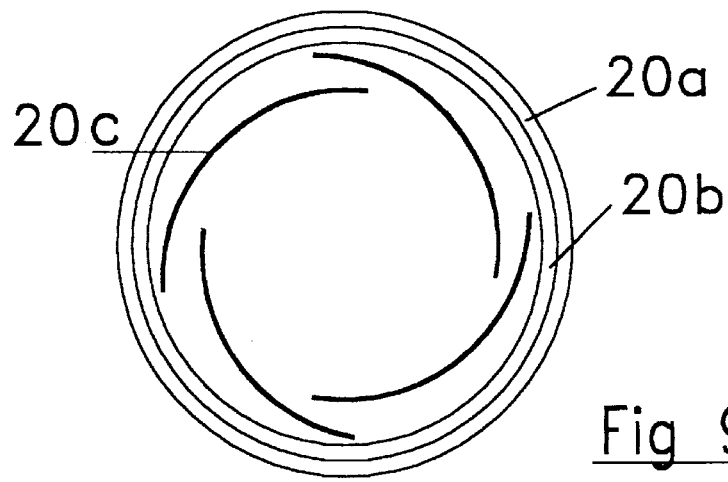
FIG. 9 illustrates a vertical cross section of an E-A heat pipe assembly. It comprises a number of heat pipes and fin assemblies. There are evaporation zones (Zone 1) and absorption zone (Zone 2) inside of the heat pipes; there are first fin heat interaction zone (Zone 3) and second fin heat interaction zone (Zone 4) outside of the heat pipes.
FIG. 9b illustrates a horizontal cross section taken at a point in the absorption zone.
FIG. 9c illustrates a cross section of an E-A heat pipe to show the struction of an entraiment separating insert used to prevent liquid water from being transferred from the evaporating zone to the absorbing zone.
Figure 9C:
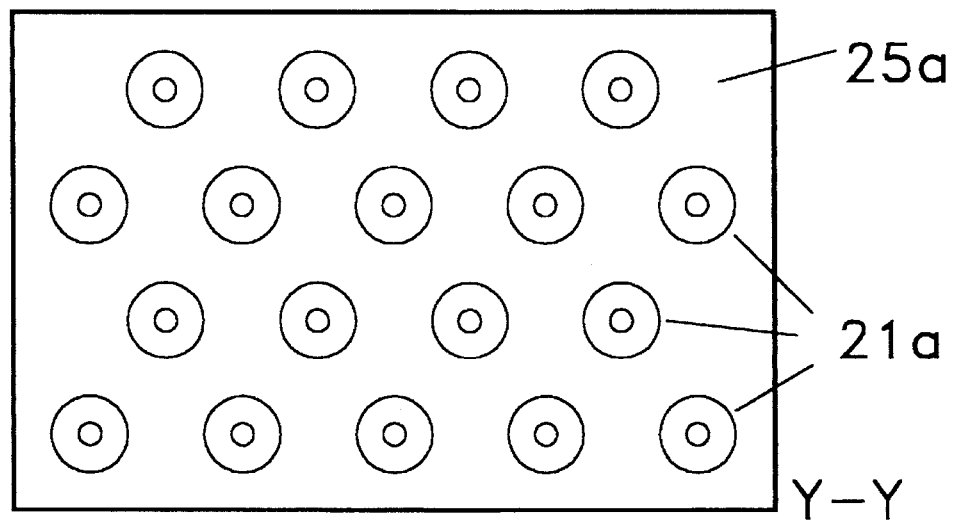
Figure 9B:
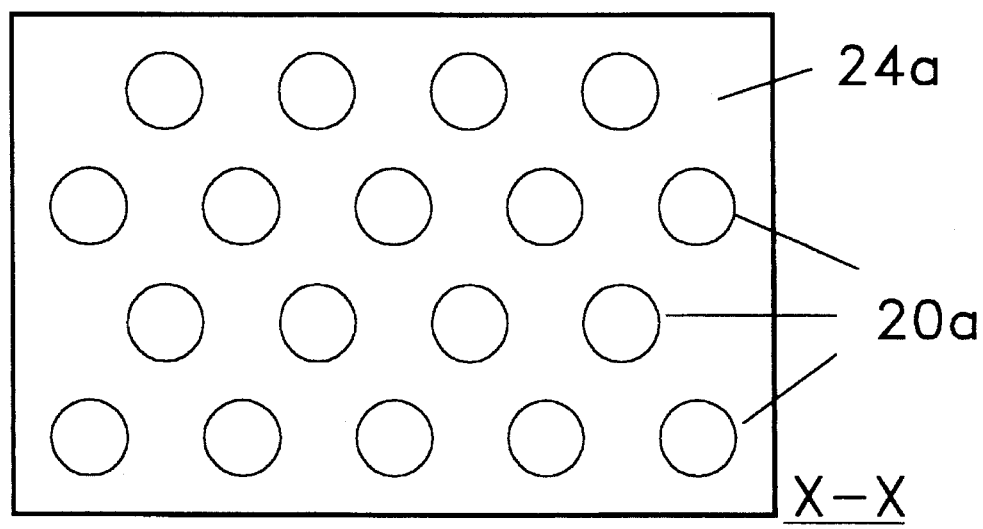

FIG. 9b illustrates a horizontal cross section of the system across the evaporation zone. It shows tubes 20a of the heat pipes and fins 24a around the tubes. FIG. 9c illustrates a horizontal cross section of the system across the absorption zone. It shows tubes 21 a of the heat pipes and fins 25a around the tubes. FIG. 9d illustrates a horizontal cross section of a heat pipe at a point in the evaporation zone. It shows a tube 20a, a falling water film 20b and an entraiment separator 20c. The entrainment separator is used to prevent liquid water from being transferred from the evaporation zone into the absorption zone.

Figure 10:
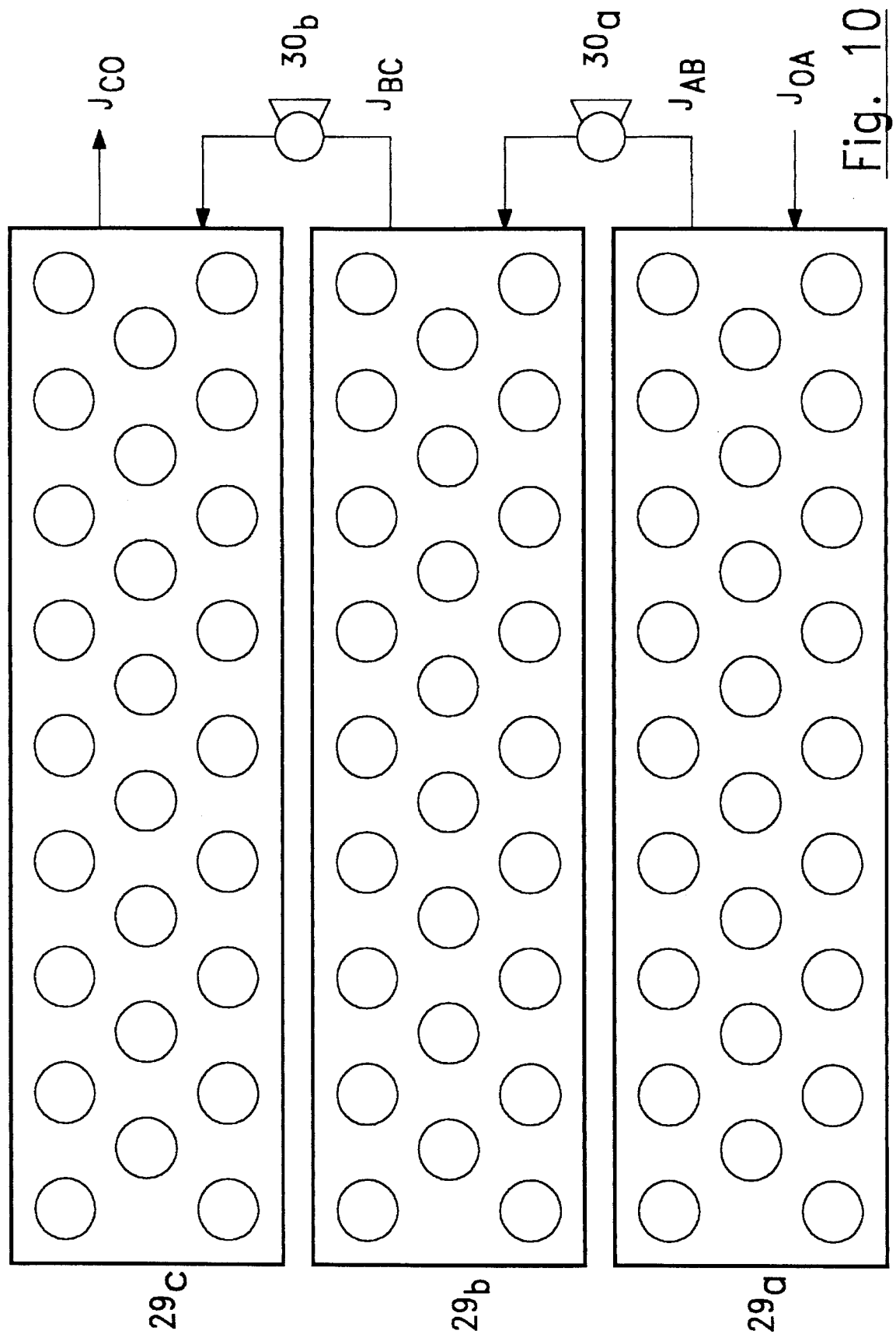
FIG. 10 illustrates an E-A heat pipe system that has several E-A heat pipe assemblies. The system may be used as a multiple pressure Zone system by operating the individual assemblies at different pressures and circulating the absorbing solution through the assemblies in series. The absorbing solution used can be lower in concentration and the changes in concentration are greater both in the absorption and regene-ration operations compared with those of a single pressure zone IHUA system.

FIG. 10 illustrates an IHUA air handler that has three E-A heat pipe assemblies 29a, 29b, 29c, that are respectively designated as A-assembly, B-assembly and C-assembly. The internal regions of these assemblies are respectively under different pressures, $P_A$, $P_B$ and $P_C$, so that the evaporating and absorbing temperatures are also different. Similar to what has been described in connection with FIGS. 4 and 5d, this system is a multiple pressure zone IHUA system and has the advantages described earlier. Since one may use pumps 30a, 30b, the pressure sequence may be $P_A > P_B > P_C$ or $P_C > P_B > P_A$.

Figure 11:
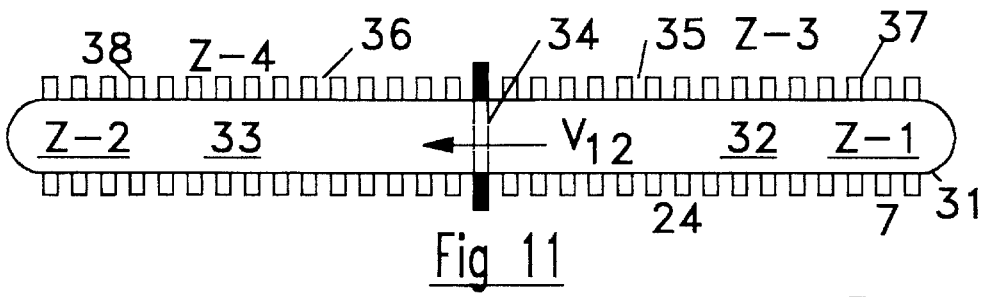
FIG. 11 illustrate the structure and operation of a Modular Single Effect Evaporation—Condensation Panel (E-C panel) that is used to concentrate a solution. When an E-C panel is used in an absorption refrigeration system, it may also be called a Modular Regeneration—Condensation Panel (R-C panel).

FIG. 11 illustrates a horizontal cross section of a single effect evaporation-condensation panel (E-C panel) that is used in concentrating a solution by evaporating the solution and condensing the resulting vapor. When it is used in association with an absorption heat upgrading system, an E-C panel may also be referred to as a Regeneration-Condensation Panel (R-C panel). An E-C panel comparises an enclosure 31, enclosed by two closely spaced heat conductive walls 31 an evaporation zone (zone 1) 32 and a condensation zone 33 and a perforated partition 34 inside of the enclosure, a heat source zone (zone 3) 35 and a heat sink zone (zone-4) 36 outside of the enclosure. One may place a first fin assembly 37 in the heat source zone to enhance heat transfer; one may also place a second fin assembly 38 in the heat sink zone to enhance heat transfer.

Figure 12:
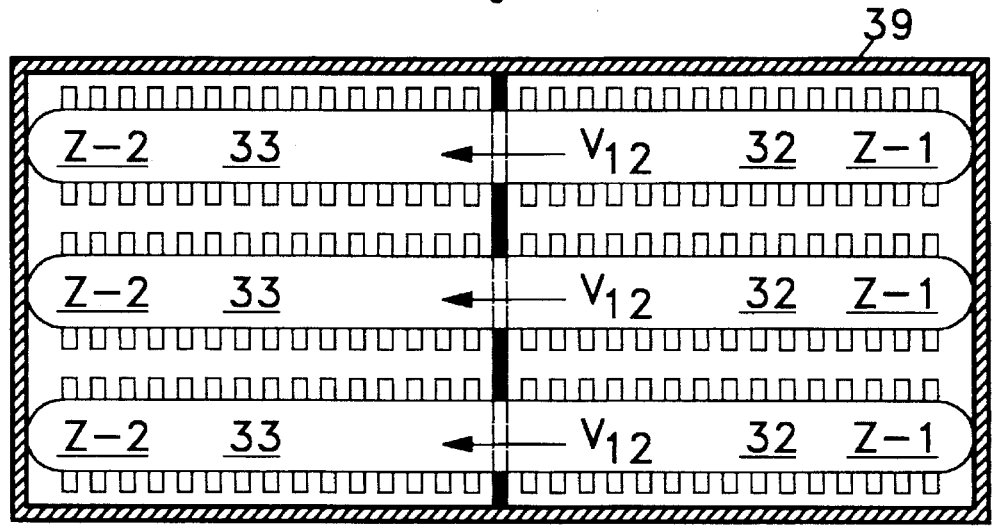
FIG. 12 illustrates an evaporation unit using one or more R-C Fanels.

FIG. 12 illustrates a solution concentration unit that comprises an enclosure 39 and one or more (three shown) E-C panels illustrated by FIG. 11. When this unit is used in regenerating an absorbing solution in an absorption heat upgrading system, it may also be referred to as a regeneration unit. In operation, a solution to be concentrated is applied to the inner walls in zone 1 of the E-C panels, a heat source medium is introduced into zone 3, and a heat sink medium is introduced into zone 4 of the panels. A heat source medium used may be steam, electricity, a hot liquid such as water after engine cooling, a hot gas such as a combustion gas or a flue gas. When the heat source medium is a hot gas, a fin assembly is needed to enhance heat transfer. A heat sink medium may be a cold liquid or a cold gas such as ambient air. When the heat sink medium is a gas, a fin assembly is needed to enhance heat transfer. Heat then flows Zone 3 to Zone 1 to cause a part of the solution in Zone 1 to vaporize and thereby concentrate the solution; the vapor generated in Zone 1 of each panel $V_{12}$ flows to Zone 2 of the same panel and condenses therein; the heat of condensation then flows from Zone 2 to Zone 4 and is transferred to the heat sink medium. It is noted the vapor $V_{12}$ flows only a short distance. This is important because, in many cases, the operating pressures are low and pressure drop for the vapor flow has to be kept small.

It is noted that a system similar to the system illustrated by FIG. 9a may be used as an evaporation-condensation system. Such a system may be referred to as an Evaporation-Condensation Heat Pipe System. When such a system is used in an absorption refrigeration system, it may be referred to as a Regeneration-Condensation Heat Pipe System.

FIG. 13 illustrates a double effect evaporation-condensation panel. When this unit is used in association with an absorption heat upgrading system for regenerating the absorbing solution, it may be referred to as a double effect regeneration panel. Referring to the figure, it has a first effect compartment, referred to as A-compartment, and a second effect compartment, referred to as B-compartment. The A-compartment has an evaporation zone, denoted as ZA-1 (zone 40) and a condensation zone, denoted as ZA-2 (zone 41). The B-compartment also has an evaporation zone, denoted as ZB-1 (zone 42), and a condensation zone, denoted as ZB-2 (zone 43). There is a heat source region outside of ZA-1 zone, denoted as ZA-3 (zone 44); there is a heat sink zone outside of ZB-2 zone, denoted as ZB-4 (zone 45). There is a perforated partition 46 between ZA-1 zone and ZA-2 zone; there is a perforated partition 47 between ZB-1 zone and ZB-2 zone and ZB-2 zone. In operation, there is heat interaction between ZA-2 zone and ZB-1 zone. Therefore, these two zone together are referred to as a heat coupling zone.

FIG. 14, illustrates a double effect solution concentration unit that comprises an enclosure 48 and one or more E-C panels (may be called R-C panels). It is seen that seals 49 are provided to prevent mixing of fluids in ZA-3 and ZB4 zones. In operation, a solution to be concentrated is applied to the walls of ZA-1 zones as falling films, another solution to Be concentrated is applied to the inner walls 50 of ZB-1, zone that are in heat communication with ZA-2 zone, a heating source medium is introduced into ZA-3 zone and a heat sink medium is introduced into ZB-4 zone. Then, heat transferres from the heat source medium in ZA-3 zone to the falling film solution in ZA-1 zone to generate vapor $(V_{12})_A$; the vapor passes through the perforated partition 46 to ZA-2 zone to be condensed therein; the heat of condensation is transmitted to ZB-1 zone to generate vapor $(V_{12})_B$; the vapor passes through the perforated partition 47 to condense in the ZB-2 (zone 43); the heat of condensation is transmitted to ZB-4 (zone 45) to transfer heat to the heat sink medium. A heat source medium may be steam, electricity, a hot liquid such as hot water, or a hot gas such as hat air or flue gas or combustion gas. A heat sink medium may be a cold Liquid or a cold gas.

One may extend the approach illustrated in FIG. 13 and 14 to devise a unit with even higher number of effects, such as a triple effect unit. In the panel illustrated by FIG. 14, ZB-1 zone is of a shape of a fork that holds on the ZA-2 zone. One may reverse this and produce a panel having ZA-2 zone shaped as a fork that hold on ZB-1 zone.

FIG. 15a and 15b illustrate an Immediate Heat Upgrading Absorption Air Conditioning System using one or more Doubly Integrated Evaporation-Absorption and Regeneration-Condensation Panels (EA-RC panels). The system comprises an outer enclosure 51, one or more EA-RC panels 52, one or more heat exchangers 53, an absorbing solution storage 54, a water storage 55 and several pumps 56, 57, 58. An EA-RC panel can be considered as a combination of an E-A panel and a R-C panel described earlier.

An EA-RC panel has an enclosure 59 having two closely spaced heat conductive walls. The enclosed space is divided into compartments, i.e. A-compartment 60 and B-compartment 61. There are an evaporation zone ZA-1 zone 62, and an absorption zone, ZA-2 zone 63 in the A-compartment; there are an evapo-ration zone, ZB-1 (zone 64), and a condensing zone, ZB-2 (zone 65) in the B-compartment. There are a heat source zone, ZA-3 (zone 66), outside of ZA-1 zone and a heat sink zone, ZA-4 (zone 67), outside of ZA-2 zone. A fin assembly may be place in each of ZA-3 and ZA-4 zones to enhance heat transfer. There are also a heat source zone, ZB-3 zone 68, outside of ZB3-1 zone and a heat sink zone, AB-4 zone 69, outside of ZB-2 zone. A fin assembly may be placed in each of the ZB-3 and ZB-4 zones to enhance heat transfer. These are spraying devices 70, 71, 72 in the ZA-1, ZA-2 and ZB-1 zones, respectively.

In operation, water ($L_{11}$ $L_{41}$), strong absorbing solution $J_{32}$, and weak absorbing solution J23 are respectively introduced into ZA-1, ZA-2 and ZB-1 zones respectively through the spraying devices 70, 71, 72. In addition, a low temperature heat source medium and a low temperature heat sink medium are respectively introduced into the ZA-3 and ZA-4 zones; a high temperature heat source medium and a high temperature heat sink medium are respectively introduced into the ZB-3 and ZB-4 zones. The low temperature heat source medium is the fluid, such as indoor air, outdoor air or water to be cooled; the low temperature heat sink medium is the fluid, such as indoor air, outdoor air, or water to be heated; the high temperature heat source medium is the heat source used to regenerate the absorbing solution; the high temperature heat sink is the fluid such as outdoor air or water to be heated.

The operational steps are as follows:

(a) Heat transfers from the low temperature heat source medium ZA-3 region to water in ZA-1 region to thereby generate water vapor $(V_{12})$A and cool the low temperature heat source medium, such as indoor air or outdoor air;

(b) The water vapor $(V_{12})$A is absorbed into a strong absorbing solution J32 to thereby dilute the solution and form a weak absorbing solution J23 and discharge the heat to the low temperature heat sink medium such as indoor air, outdoor air, or water;

(c) The weak absorbing solution is pumped by a pump 56 exchanges heat with a strong absorbing solution and a condensate stream in the heat exchanger 53 and then introduced into ZB-1 zone;

(d) Heat flows from the high temperature heat source medium in ZB-3 zone to the solution in ZB-1 zone to vaporize the solution and thereby from a vapor stream $(V_{12})$B and the strong absorbing solution J32;

(e) The vapor $(V_{12})$B condenses in ZB-2 zone and the heat is transtferred to the high temperature heat sink medium;

(f) Both the strong absorbing solution and the condensate exchange heat with the weak absorbing solution in the heat exchanger 53 and are respectively introduced into the absorbing solution storage 54 and the water storage 55. Pumps 57 and 58 are used to pump the strong absorbing solution and water into ZA-2 and ZA-1 zones respectively.

The system illustrated by FIGS. 15a and 15b are useful when the region to be cooled and the heat source for solution regeneration are closely located. Therefore, this system is useful in providing air conditioning for a moving vehicle such as an automobile. Here, the high temperature heat source medium is hot water or hot air produced by exchanging heat with the engine. A system illustrated may also be used for room cooling. In this case, combustion of a fuel or an electric power supply provides the heat needed for regenerating the absorbing solution.

FIG. 16 illustrates another type of EA-RC panel that has heat exchangers 53a, 53b, an absorbing solution storage 54 and a water storage 55 in addition to a low pressure evaporation zone, ZA-1 (zone 62), a low pressure absorption zone, ZA-2 (zone 63), a high pressure regeneration zone, ZB-1 zone 64, and a high pressure conderaing zone, ZB-2 (zone 65). The operational steps of a system using EA-RC panels described are similar to the operations of the system of FIGS. 15a and 15b. The major advantage of this type of panels are that they are modularized, can be mass produced, and can be made hermetically sealed. FIG. 17 illustrates yet another type of EA-RC panel that is similar to that of FIG. 16, except that the B-compartment with ZB-1 and ZB-2 zones are placed above the A-compartment with the ZA-1 and ZA-2 zones and that the storages 54, 55 and the heat exchangers 53a, 53b are placed in the middle region. The operatinal steps of a system with panels of FIG. 17 are similar to those of a system with panels of FIG. 16.

FIG. 18 summmerizes the characteristic features and advantages of an mediate Heat Upgrading Absorption Air Conditioning System of the present invention. It takes in heat from air to be cooled, upgrades it and discharges the upgraded heat to air or water to be heated immediately. It also introduces hermetically sealed E-A panels, E-A heat pipe assemblies, R-C panels (also called E-C panels) R-C heat pipe assemblies and combined EA-RC panels. The temperature lift defined as the difference between the absorption temperature and the evaporation temperature in an IHUA system is greatly reduced. Therefore, one may use an absorbing solution containing a common salt, such as $CaCl_2$, or $MgCl_2$, rather than LiBr, which is rather expensive and may have some enviromental impact. EA panels, RC panels, and EA-RG panels and corresponding heat pipe assemblies are hermetically sealed and can be mass produced. Vapors $(V_{12})_A$ and $(V_{12})_B$ only travel short distances. Only water and an aqueous solution are stored and circulated. Freon is not used. Therefore, the use of air conditioning systems of the present invention does not cause ozone layer depletion. Cool storage can be provided by storing the weak absorbing solution, the strong absorbing solution and water and regenerate the absorbing solution at night, which is referred to as off peak hours for the power usage. It can therefore accomplish the desirable power levelling. Because of the low temperature lift, the steam required for regeneration is reduced, the electric power required for regeneration is reduced, and even waste heat can be used for regeneration. Because the panels and heat pipes used are hermetically sealed and can be mass produced, an IHUA air conditioning system can be reliably operated and the equipment cost is low. The cool storage system has a high cool thermal energy storing capacity.

What are claimed are as follows:

1. An apparatus for heat upgrading by absorption by taking heat in from a first fluid at a first temperature or temperature range and supplying heat to a second fluid at a second temperature or temperature range that is higher than the first temperature or temperature range that comprises one or more Type A processing regions and each Type A processing region comprises:

(a) one or more first vertical heat conductive walls, designated as A-walls, each having a first surface, designated as an A-1 surface, and a second surface, designated as an A-2 surface;

(b) one or more second vertical heat conductive walls, designated as B-walls, each having a first surface, designated as a B-1 surface, and a second surface, designated as a B-2 surface;

(c) one or more enclosures, each being in contact with one or more A-1 surfaces and one or more B-1 surfaces;

(d) a first internal processing zone, designated as Zone A-1, that is inside of each enclosure and is in contact with one or more A-1 surfaces, a second internal processing zone, designated as Zone A-2, that is also inside of each enclosure and is in contact with one or more B-1 surfaces and a vapor passage, designated as Z-VP, to allow flow of vapor from Zone A-1 to Zone A-2;

(e) a first external processing zone, designated as Zone A-3, that is outside of each enclosure and is in contact with one or more A-2 surfaces and a second external processing zone, designated as Zone A-4, that is outside of each enclosure and is in contact with one or more B-2 surfaces;

so that conduction of the following operational steps:

(a) introducing water into Zone A-1, (b) introducing a first absorbing solution into Zone A-2, (c) introducing the first mass of fluid into Zone A-3, and (d) introducing the second mass of fluid into Zone A-4;

leads to the occurrence of the following operational steps:

(a) heat transfers from Zone A-3 to Zone A-1 to thereby cool the first mass of fluid in Zone A-3 and vaporize water in Zone A-1 to form a first water vapor;

(b) the first water vapor flows through the vapor passage from Zone A-1 to Zone A-2 and is absorbed into the absorbing solution to thereby release the heat of absorption and form a second and diluted absorbing solution;

(c) heat transfers from Zone A-2 to Zone A-4 to thereby heat the second mass of fluid in Zone A-4.

2. An apparatus of claim 1 that is further characterized in that:

(a) the apparatus comprises more than one Type A processing regions, respectively designated as R-1 through R-N regions, that are connected by pressure isolating partitions and fluid passages;

(b) an absorbing solution flows successively through the multiple processing regions in the sequence of R-1 through R-N regions;

(c) the operating pressures in the R-1 through R-N regions, designated as P1 through PN, are substantially different.

3. An apparatus of claim 1, wherein an A-wall and a B-wall form a flat vessel, referred to as a panel, having a first dimension in the thickness direction, a second dimension in the width direction and a third dimension in the height direction, and each of the enclosure is enclosed by an A-1 surface and a B-1 surface.

4. An apparatus of claim 3, wherein the first internal processing zone, Zone A-1, and the second internal processing zone, Zone A-2, are in a side-by-side arrangement along the width direction of the flat vessel.

5. An apparatus of claim 3, wherein the first internal processing zone, Zone A-1, and the second internal processing zone, Zone A-2, are in a front-to-back arrangement in the thickness direction of the flat vessel.

6. An apparatus of one of claims 3 through 5 that is further characterized in that:

(a) there are more than one Type A processing regions, respectively designated as R-1 through R-N regions, along the vertical direction of the flat vessel and are connected therein by pressure isolating means;

(b) at least an absorbing solution flows successively through the multiple processing regions in the sequence of R-1 through R-N regions;

(c) the operating pressures in the R-1 through R-N regions, designated as P1 through PN, are substantially different.

7. An apparatus of claim 52, wherein the operating pressures in the R-1 through R-N regions are in the sequence of $P1>P2> \ldots >PN$.

8. An apparatus of claim 2, wherein the operating pressures in the R-1 through R-N regions are in the sequence of $P1<P2< \ldots <PN$.

9. An apparatus of claim 6, wherein the operating pressures in the R-1 through R-N regions are in the sequence of $P1>P2> \ldots >PN$.

10. An apparatus of claim 6, wherein the operating pressures in the R-1 through R-N regions are in the sequence of $P1<P2< \ldots <PN$.

11. An apparatus of one of claims 1, 2, 3, 4 and 5, wherein the first fluid introduced into Zone A-3 is either water or air and the second fluid introduced into Zone A-4 is either water or air.

12. A process for heat upgrading by absorption by taking heat in from a first fluid at a first temperature or temperature range and supplying heat to a second fluid at a second temperature or temperature range that is higher than the first temperature or temperature range in a processing system that comprises one or more Type A processing regions and each processing region comprises:

(a) one or more first vertical heat conductive walls, designated as A-walls, each having a first surface, designated as an A-1 surface, and a second surface, designated as an A-2 surface;

(b) one or more second vertical heat conductive walls, designated as B-walls, each having a first surface, designated as a B-1 surface, and a second surface, designated as a B-2 surface;

(c) one or more enclosures, each being in contact with one or more A-1 surfaces and one or more B-1 surfaces;

(d) a first internal processing zone, designated as Zone A-1, that is inside of each enclosure and is in contact with one or more A-1 surfaces, a second internal processing zone, designated as Zone A-2, that is also inside of each enclosure and is in contact with one or more B-1 surfaces and a vapor passage, designated as Z-VP, to allow flow of vapor from Zone A-1 to Zone A-2;

(e) a first external processing zone, designated as Zone A-3, that is outside of each enclosure and is in contact with one or more A-2 surfaces and a second external processing zone, designated as Zone A-4, that is outside of each enclosure and is in contact with one or more B-2 surfaces;

so that conduction of the following operational steps:

(a) introducing water into Zone A-1, (b) introducing a first absorbing solution into Zone A-2, (c) introducing the first mass of fluid into Zone A-3, and (d) introducing the second mass of fluid into Zone A-4;

leads to the occurrence of the following operational steps:

(a) heat transfers from Zone A-3 to Zone A-1 to thereby cool the first mass of fluid in Zone A-3 and vaporize water in Zone A-1 to form a first water vapor;

(b) the first water vapor flows through the vapor passage from Zone A-1 to Zone A-2 and is absorbed into the absorbing solution to thereby release the heat of absorption and form a second and diluted absorbing solution;

(c) heat transfers from Zone A-2 to Zone A-4 to thereby heat the second mass of fluid in Zone A-4.

13. A process of claim 12 that is further characterized in that:

(a) the processing system comprises more than one Type A processing regions, respectively designated as R-1 through R-N regions, that are connected by pressure isolating partitions and fluid passages;

(b) an absorbing solution flows successively through the multiple processing regions in the sequence of R-1 through R-N regions;

(c) the operating pressures in the R-1 through R-N regions, designated as P1 through PN, are substantially different.

14. A process of claim 12, wherein an A-wall and a B-wall form a flat vessel, referred to as a panel, having a first dimension in the thickness direction, a second dimension in the width direction and a third dimension in the height direction, and each of the enclosure is enclosed by an A-1 surface and a B-1 surface.

15. A process of claims 14 that is further characterized in that:

(a) there are more than one Type A processing regions, respectively designated as R-1 through R-N regions, along the vertical direction of the flat vessel and are connected therein by pressure isolating means;

(b) at least an absorbing solution flows successively through the multiple processing regions in the sequence of R-1 through R-N regions;

(c) the operating pressures in the R-1 through R-N regions, designated as P1 through PN, are substantially different.

16. A process of claim 15, wherein the operating pressures in the R-1 through R-N regions are in the sequence of $P1>P2> \ldots >PN$.

17. A process of claim 15, wherein the operating pressures in the R-1 through R-N regions are in the sequence of $P1<P2< \ldots <PN$.

18. A process of one of claims 12, 13, 14, and 15, wherein the first fluid introduced into Zone A-3 is either water or air and the second fluid introduced into Zone A-4 is either water or air.

19. A multiple pressure region heat upgrading absorption system for taking heat in from a first fluid at a first temperature range and supplying heat to a second fluid at a second temperature range that is higher than the first temperature range that is characterized in that:

(a) the system comprises more than one Type A processing regions, respectively designated as R-1 through R-N regions, that are connected by pressure isolating partitions;

(b) an absorbing solution used therein flows through the multiple processing regions in the sequence of R-1 through R-N regions;

(c) the operating pressures in the R-1 through R-N regions, designated as P1 through PN, are substantially different;

and wherein each Type A processing region comprises:

(a) one or more first heat conductive walls, designated as A-walls, each having a first surface, designated as an A-1 surface, and a second surface, designated as an A-2 surface;

(b) one or more second heat conductive walls, designated as B-walls, each having a first surface, designated as a B-1 surface, and a second surface, designated as a B-2 surface;

(c) one or more enclosures, each being in contact with one or more A-1 surfaces and one or more B-1 surfaces;

(d) a first internal processing zone, designated as Zone A-1, that is inside of each enclosure and is in contact with one or more A-1 surfaces, a second internal processing zone, designated as Zone A-2, that is also inside of each enclosure and is in contact with one or more B-1 surfaces and a vapor passage, designated as ZVP, to allow flow of vapor from Zone A-1 to Zone A-2;

(e) a first external processing zone, designated as Zone A-3, that is outside of each enclosure and is in contact with one or more A-2 surfaces and a second external processing zone, designated as Zone A-4, that is outside of each enclosure and is in contact with one or more B-2 surfaces;

so that conduction of the following operational steps:

(a) introducing water into Zone A-1, (b) introducing a first absorbing solution into Zone A-2, (c) introducing the first mass of fluid into Zone A-3, and (d) introducing the second mass of fluid into Zone A-4;

leads to the occurrence of the following operational steps:

(a) heat transfers from Zone A-3 to Zone A-1 to thereby cool the first mass of fluid in Zone A-3 and vaporize water in Zone A-1 to form a first water vapor;

(b) the first water vapor flows through the vapor passage from Zone A-1 to Zone A-2 and is absorbed into the absorbing solution to thereby release the heat of absorption and form a second and diluted absorbing solution;

(c) heat transfers from Zone A-2 to Zone A-4 to thereby heat the second mass of fluid in Zone A-4.

20. A system of claim 19, wherein the first fluid introduced into Zone A-3 is either water or air and the second fluid introduced into Zone A-4 is either water or air.

21. A heat upgrading absorption system for cooling or heating an air mass to be conditioned by taking heat in from a first mass of fluid at a first temperature and supplying heat to a second mass of fluid at a second temperature that is higher than the first temperature, one of the masses of fluid being the air mass to be conditioned, that comprises a first sub-system that comprises one or more air, handlers, each exchanging heat with the air mass to be conditioned, and each air handler comprises one or more Type A processing regions, and each Type A processing region comprises:

(a) a Type A enclosure surrounded by a Type A heat conductive wall;

(b) an evaporation zone and an absorption zone and a vapor passage between the two zones within the Type A enclosure;

(c) a first heat interaction zone that is outside of the Type A enclosure and is in heat communication with Zone A-1 through a first portion of the Type A heat conductive wall;

(d) a second heat interaction zone that is also outside of the Type A enclosure and is in heat communication with Zone A-2 through a second portion of the Type A heat conduction wall;

so that conduction of the following operational steps:

(a) introducing water into Zone A-1, (b) introducing a first absorbing solution into Zone A-2, (c) introducing the first mass of fluid into Zone A-3, and (d) introducing the second mass of fluid into Zone A-4;

leads to the occurrence of the following operational steps:

(a) heat transfers from Zone A-3 to Zone A-1 to thereby cool the first mass of fluid in Zone A-3 and vaporize water in Zone A-1 to form a first water vapor;

(b) the first water vapor flows through the vapor passage from Zone A-1 to Zone A-2 and is absorbed into the absorbing solution to thereby release the heat of absorption and form a second and diluted absorbing solution;

(c) heat transfers from Zone A-2 to Zone A-4 to thereby heat the second mass of fluid in Zone A-4.

22. A system of claim 21, wherein the first mass of fluid is water or air and the second mass of fluid is also water or air.

23. A system of claim 21, which further comprises a second sub-system for concentrating the second absorbing solution to regenerate the first absorbing solution and produce a mass of water and a third sub-system for transferring the first absorbing solution and water into the first sub-system and removing the second absorbing solution from the first sub-system.

24. A system of claim 23 which further comprises a fourth sub-system for storing a mass of water, a mass of the first absorbing solution and a mass of the second absorbing solution so that at least a portion of the second absorbing solution formed in the first sub-system during a first period of time is concentrated in the second sub-system during a second period of time different from the first period.

25. A system of claim 24, wherein at least a part of the second period of time is within the off peak hours of power consumption that includes at least a part of the period between 8:00 p.m. of a day and 8:00 a.m. of the next day.

26. A system of claim 21, wherein each Type A heat conductive wall of each Type A processing region forms a fiat vessel designated as a Type A processing panel having a first dimension in the thickness direction, a second dimension in the width direction and a third dimension in the height direction, and is characterized by that:

(a) the first dimension is 5.0 cm or less;

(b) Zone A-1 and Zone A-2 are inside of the panel;

(c) Zone A-3 and Zone A-4 are outside of the panel.

27. A system of claim 23, wherein the second sub-system comprises one or more type B processing regions and each Type B type processing region comprises:

(a) a Type B enclosure surrounded by a Type B heat conductive wall;

(b) a concentration or regeneration zone, a condensation zone and a vapor passage between the two zones within the Type B enclosure;

(c) a heat source zone that is outside of the Type B enclosure and is in heat communication with Zone B-1 through a first portion of the Type B heat conductive wall;

(d) a heat sink zone that is outside of the Type B enclosure and is in heat communication with Zone B-2 through a second portion of the Type B heat conductive wall;

so that conduction of the following operational steps:
 (a) introducing the second absorbing solution into Zone B-1;
 (b) introducing a heat source medium into Zone B-3;
 (c) introducing a heat sink medium into Zone B-4;
leads to the occurrence of the following steps:
 (a) heat transfers from Zone B-3 to Zone B-1 to vaporize water from the absorbing solution to thereby form a second vapor and concentrate the absorbing solution;
 (b) the second vapor flows through the vapor passage from Zone B-1 to Zone B-2 and is condensed therein to release heat of condensation and form a mass of condensate, which is water;
 (c) heat transfers from Zone B-2 to Zone B-4 to thereby heat the heat sink medium.

28. A system of claim 27, wherein each Type B heat conductive wall of each Type B processing region forms a fiat vessel designated as a Type B processing panel having a first dimension in the thickness direction, a second dimension in the width direction and a third dimension in the height direction, and is characterized by that:
 (a) the first dimension is 5.0 cm or less;
 (b) Zone B-1 and Zone B-2 are inside of the panel;
 (c) Zone B-3 and Zone B-4 are outside of the panel.

29. A system of claim 28, wherein the absorbing solution in Zone B-1 forms a falling liquid film.

* * * * *